United States Patent
Abedini et al.

(10) Patent No.: US 11,831,389 B2
(45) Date of Patent: Nov. 28, 2023

(54) TECHNIQUES FOR REPORTING REPEATER COMMUNICATION CAPABILITY

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/443,111

(22) Filed: Jul. 21, 2021

(65) Prior Publication Data

US 2022/0045746 A1 Feb. 10, 2022

Related U.S. Application Data

(60) Provisional application No. 62/706,180, filed on Aug. 4, 2020, provisional application No. 62/706,171, filed on Aug. 4, 2020, provisional application No. 62/706,175, filed on Aug. 4, 2020.

(51) Int. Cl.
*H04B 7/155* (2006.01)
*H04L 5/14* (2006.01)

(52) U.S. Cl.
CPC .......... *H04B 7/15528* (2013.01); *H04L 5/14* (2013.01)

(58) Field of Classification Search
CPC .............................. H04B 7/15528; H04L 5/14
See application file for complete search history.

(56) References Cited

U.S. PATENT DOCUMENTS

| | | | |
|---|---|---|---|
| 2012/0182918 A1* | 7/2012 | Jen | H04L 1/1825 370/312 |
| 2012/0213105 A1* | 8/2012 | Wigren | G01S 5/06 370/252 |
| 2013/0003746 A1* | 1/2013 | Klein | H04L 12/46 370/465 |
| 2014/0171062 A1* | 6/2014 | Fallgren | H04W 40/22 455/422.1 |
| 2014/0301370 A1* | 10/2014 | Sivavakeesar | H04B 7/15 370/331 |

(Continued)

OTHER PUBLICATIONS

International Search Report and Written Opinion—PCT/US2021/070930—ISA/EPO—dated Jan. 7, 2022.

(Continued)

*Primary Examiner* — Bailor C Hsu
(74) *Attorney, Agent, or Firm* — Dalei Dong; Harrity & Harrity, LLP

(57) ABSTRACT

Various aspects of the present disclosure generally relate to wireless communication. In some aspects, a repeater node may transmit a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The repeater node may receive, from a control node, a configuration, for a digital repeating operation, that is based at least in part on the capability report. Numerous other aspects are described.

30 Claims, 20 Drawing Sheets

(56) References Cited

U.S. PATENT DOCUMENTS

| | | | |
|---|---|---|---|
| 2015/0016309 A1* | 1/2015 | Fang | H04W 74/0808 |
| | | | 370/277 |
| 2015/0055547 A1* | 2/2015 | Licardie | H04B 17/309 |
| | | | 370/315 |
| 2015/0372801 A1 | 12/2015 | Smee et al. | |
| 2017/0170946 A1* | 6/2017 | Min | H04L 5/1438 |
| 2017/0272221 A1* | 9/2017 | Yi | H04W 16/14 |
| 2018/0227904 A1* | 8/2018 | Raghunathan | H04W 8/22 |
| 2020/0008127 A1* | 1/2020 | Ohtsuji | H04W 4/70 |
| 2020/0052775 A1 | 2/2020 | Nam et al. | |
| 2020/0274686 A1* | 8/2020 | Khude | H04W 74/0816 |
| 2021/0376892 A1* | 12/2021 | Zhang | H04W 24/10 |
| 2021/0376941 A1* | 12/2021 | Zhang | H04L 5/0073 |
| 2021/0392650 A1* | 12/2021 | Abedini | H04W 74/0833 |

OTHER PUBLICATIONS

Partial International Search Report—PCT/US2021/070930—ISA/EPO—dated Nov. 8, 2021.

* cited by examiner

TECHNIQUES FOR REPORTING REPEATER COMMUNICATION CAPABILITY

CROSS-REFERENCE TO RELATED APPLICATIONS

This patent application claims priority to U.S. Provisional Patent Application No. 62/706,171, filed on Aug. 4, 2020, entitled "TECHNIQUES FOR REPORTING REPEATER DUPLEXING COMMUNICATION CAPABILITY," and assigned to the assignee hereof; to U.S. Provisional Patent Application No. 62/706,180, filed on Aug. 4, 2020, entitled "TECHNIQUES FOR DETERMINING A DUPLEXING MODE OF OPERATION OF A REPEATER NODE," and assigned to the assignee hereof; and to U.S. Provisional Patent Application No. 62/706,175, filed on Aug. 4, 2020, entitled "TECHNIQUES FOR REPORTING PROCESSING LATENCY OF A REPEATER NODE," and assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for reporting a repeater communication capability.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a repeater node. The method may include transmitting a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The method may include receiving, from a control node, a configuration, for a digital repeating operation, that is based at least in part on the capability report.

In some aspects, the method includes performing the digital repeating operation based at least in part on the configuration for the repeating operation.

In some aspects, performing the digital repeating operation comprises: receiving, from a first wireless node, a signal; digitally processing the signal; regenerating the signal to form a regenerated signal based at least in part on digitally processing the signal; and transmitting, to a second wireless node, the regenerated signal.

In some aspects, the duplexing mode report includes an indication of the one or more duplexing modes supported by the repeater node, and the duplexing mode report includes one or more of an indication of a self-interference delay, an indication of a buffering capability, an indication of a forwarding latency, or an indication of a power consumption of the repeater node when operating in the one or more duplexing modes.

In some aspects, the self-interference delay of the repeater node comprises a sum of a clutter echo round trip time and a processing latency of an incoming signal.

In some aspects, the buffering capability of the repeater node is based at least in part on an amount of data that the repeater node can store.

In some aspects, the power consumption of the repeater node is based at least in part on an amount of power consumed when operating in the one or more duplexing modes.

In some aspects, transmitting the capability report comprises: receiving, from the control node, an initial configuration for the digital repeating operation; and transmitting, to the control node, the capability report based at least in part on the repeater node being unable to support the initial configuration.

In some aspects, transmitting the capability report comprises: transmitting, during an initial capability exchange with the control node, the capability report.

In some aspects, transmitting the capability report comprises: transmitting, to the control node, an indication that the repeater node supports a conditional full-duplex communication capability associated with at least one of: one or more antenna array pairs, or one or more beam pairs.

In some aspects, the duplexing communication capability of the repeater node is at least one of: a half-duplex communication capability, a full-duplex communication capability, a conditional full-duplex communication capability, or a full-duplex forwarding communication capability.

In some aspects, the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

In some aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Some aspects described herein relate to a method of wireless communication performed by a control node. The method may include receiving, from a repeater node, a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The method may include transmitting, to the repeater node, a configuration, for a digital repeating operation, that is based at least in part on the capability report.

In some aspects, the method includes determining the configuration based at least in part on the capability report.

In some aspects, the duplexing mode report includes an indication of the one or more duplexing modes supported by the repeater node, and the duplexing mode report includes one or more of an indication of a self-interference delay, an indication of a buffering capability, an indication of a forwarding latency, or an indication of a power consumption of the repeater node when operating in the one or more duplexing modes.

In some aspects, the self-interference delay of the repeater node comprises a sum of a clutter echo round trip time and a processing latency of an incoming signal.

In some aspects, the buffering capability of the repeater node is based at least in part on an amount of data that the repeater node can store.

In some aspects, the power consumption of the repeater node is based at least in part on an amount of power consumed when operating in the one or more duplexing modes.

In some aspects, receiving the capability report comprises: transmitting, to the repeater node, an initial configuration for the digital repeating operation; and receiving, from the repeater node, the capability report based at least in part on the repeater node being unable to support the initial configuration.

In some aspects, receiving the capability report comprises: receiving, during an initial capability exchange with the repeater node, the capability report.

In some aspects, receiving the capability report comprises: receiving, from the repeater node, an indication that the repeater node supports a conditional full-duplex communication capability associated with at least one of: one or more antenna array pairs, or one or more beam pairs.

In some aspects, the duplexing communication capability of the repeater node is at least one of: a half-duplex communication capability, a full-duplex communication capability, a conditional full-duplex communication capability, or a full-duplex forwarding communication capability.

In some aspects, the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

In some aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Some aspects described herein relate to a repeater node for wireless communication. The repeater node may include a memory and one or more processors coupled to the memory. The one or more processors may be configured to transmit a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The one or more processors may be configured to receive, from a control node, a configuration, for a digital repeating operation, that is based at least in part on the capability report.

In some aspects, the one or more processors are further configured to: perform the digital repeating operation based at least in part on the configuration for the repeating operation.

In some aspects, the one or more processors, to perform the digital repeating operation, are configured to: receive, from a first wireless node, a signal; digitally process the signal; regenerate the signal to form a regenerated signal based at least in part on digitally processing the signal; and transmit, to a second wireless node, the regenerated signal.

In some aspects, the duplexing mode report includes an indication of the one or more duplexing modes supported by the repeater node, and the duplexing mode report includes one or more of an indication of a self-interference delay, an indication of a buffering capability, an indication of a forwarding latency, or an indication of a power consumption of the repeater node when operating in the one or more duplexing modes.

In some aspects, the self-interference delay of the repeater node comprises a sum of a clutter echo round trip time and a processing latency of an incoming signal.

In some aspects, the buffering capability of the repeater node is based at least in part on an amount of data that the repeater node can store.

In some aspects, the power consumption of the repeater node is based at least in part on an amount of power consumed when operating in the one or more duplexing modes.

In some aspects, the one or more processors, to transmit the capability report, are configured to: receive, from the control node, an initial configuration for the digital repeating operation; and transmit, to the control node, the capability report based at least in part on the repeater node being unable to support the initial configuration.

In some aspects, the one or more processors, to transmit the capability report, are configured to: transmit, during an initial capability exchange with the control node, the capability report.

In some aspects, the one or more processors, to transmit the capability report, are configured to: transmit, to the control node, an indication that the repeater node supports a conditional full-duplex communication capability associated with at least one of: one or more antenna array pairs, or one or more beam pairs.

In some aspects, the duplexing communication capability of the repeater node is at least one of: a half-duplex communication capability, a full-duplex communication capability, a conditional full-duplex communication capability, or a full-duplex forwarding communication capability.

In some aspects, the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

In some aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Some aspects described herein relate to a control node for wireless communication. The control node may include a memory and one or more processors coupled to the memory. The one or more processors may be configured to receive, from a repeater node, a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The one or more processors may be configured to transmit, to the repeater node, a configuration, for a digital repeating operation, that is based at least in part on the capability report.

In some aspects, the one or more processors are further configured to: determine the configuration based at least in part on the capability report.

In some aspects, the duplexing mode report includes an indication of the one or more duplexing modes supported by the repeater node, and the duplexing mode report includes one or more of an indication of a self-interference delay, an indication of a buffering capability, an indication of a forwarding latency, or an indication of a power consumption of the repeater node when operating in the one or more duplexing modes.

In some aspects, the self-interference delay of the repeater node comprises a sum of a clutter echo round trip time and a processing latency of an incoming signal.

In some aspects, the buffering capability of the repeater node is based at least in part on an amount of data that the repeater node can store.

In some aspects, the power consumption of the repeater node is based at least in part on an amount of power consumed when operating in the one or more duplexing modes.

In some aspects, the one or more processors, to receive the capability report, are configured to: transmit, to the repeater node, an initial configuration for the digital repeating operation; and receive, from the repeater node, the capability report based at least in part on the repeater node being unable to support the initial configuration.

In some aspects, the one or more processors, to receive the capability report, are configured to: receive, during an initial capability exchange with the repeater node, the capability report.

In some aspects, the one or more processors, to receive the capability report, are configured to: receive, from the repeater node, an indication that the repeater node supports a conditional full-duplex communication capability associated with at least one of: one or more antenna array pairs, or one or more beam pairs.

In some aspects, the duplexing communication capability of the repeater node is at least one of: a half-duplex communication capability, a full-duplex communication capability, a conditional full-duplex communication capability, or a full-duplex forwarding communication capability.

In some aspects, the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

In some aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Some aspects described herein relate to a non-transitory computer-readable medium that stores a set of instructions for wireless communication by a repeater node. The set of instructions, when executed by one or more processors of the repeater node, may cause the repeater node to transmit a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The set of instructions, when executed by one or more processors of the repeater node, may cause the repeater node to receive, from a control node, a configuration, for a digital repeating operation, that is based at least in part on the capability report.

In some aspects, the one or more instructions further cause the repeater node to: perform the digital repeating operation based at least in part on the configuration for the repeating operation.

In some aspects, the one or more instructions, that cause the repeater node to perform the digital repeating operation, cause the repeater node to: receive, from a first wireless node, a signal; digitally process the signal; regenerate the signal to form a regenerated signal based at least in part on digitally processing the signal; and transmit, to a second wireless node, the regenerated signal.

In some aspects, the duplexing mode report includes an indication of the one or more duplexing modes supported by the repeater node, and the duplexing mode report includes one or more of an indication of a self-interference delay, an indication of a buffering capability, an indication of a forwarding latency, or an indication of a power consumption of the repeater node when operating in the one or more duplexing modes.

In some aspects, the self-interference delay of the repeater node comprises a sum of a clutter echo round trip time and a processing latency of an incoming signal.

In some aspects, the buffering capability of the repeater node is based at least in part on an amount of data that the repeater node can store.

In some aspects, the power consumption of the repeater node is based at least in part on an amount of power consumed when operating in the one or more duplexing modes.

In some aspects, the one or more instructions, that cause the repeater node to transmit the capability report, cause the repeater node to: receive, from the control node, an initial configuration for the digital repeating operation; and transmit, to the control node, the capability report based at least in part on the repeater node being unable to support the initial configuration.

In some aspects, the one or more instructions, that cause the repeater node to transmit the capability report, cause the repeater node to: transmit, during an initial capability exchange with the control node, the capability report.

In some aspects, the one or more instructions, that cause the repeater node to transmit the capability report, cause the repeater node to: transmit, to the control node, an indication that the repeater node supports a conditional full-duplex communication capability associated with at least one of: one or more antenna array pairs, or one or more beam pairs.

In some aspects, the duplexing communication capability of the repeater node is at least one of: a half-duplex communication capability, a full-duplex communication capability, a conditional full-duplex communication capability, or a full-duplex forwarding communication capability.

In some aspects, the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

In some aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Some aspects described herein relate to a non-transitory computer-readable medium that stores a set of instructions for wireless communication by a control node. The set of instructions, when executed by one or more processors of the control node, may cause the control node to receive, from a repeater node, a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The set of instructions, when executed by one or more processors of the control node, may cause the control node to transmit, to the repeater node, a configuration, for a digital repeating operation, that is based at least in part on the capability report.

In some aspects, the one or more instructions further cause the control node to: determine the configuration based at least in part on the capability report.

In some aspects, the duplexing mode report includes an indication of the one or more duplexing modes supported by the repeater node, and the duplexing mode report includes one or more of an indication of a self-interference delay, an indication of a buffering capability, an indication of a forwarding latency, or an indication of a power consumption of the repeater node when operating in the one or more duplexing modes.

In some aspects, the self-interference delay of the repeater node comprises a sum of a clutter echo round trip time and a processing latency of an incoming signal.

In some aspects, the buffering capability of the repeater node is based at least in part on an amount of data that the repeater node can store.

In some aspects, the power consumption of the repeater node is based at least in part on an amount of power consumed when operating in the one or more duplexing modes.

In some aspects, the one or more instructions, that cause the control node to receive the capability report, cause the control node to: transmit, to the repeater node, an initial configuration for the digital repeating operation; and receive, from the repeater node, the capability report based at least in part on the repeater node being unable to support the initial configuration.

In some aspects, the one or more instructions, that cause the control node to receive the capability report, cause the control node to: receive, during an initial capability exchange with the repeater node, the capability report.

In some aspects, the one or more instructions, that cause the control node to receive the capability report, cause the control node to: receive, from the repeater node, an indication that the repeater node supports a conditional full-duplex communication capability associated with at least one of: one or more antenna array pairs, or one or more beam pairs.

In some aspects, the duplexing communication capability of the repeater node is at least one of: a half-duplex communication capability, a full-duplex communication capability, a conditional full-duplex communication capability, or a full-duplex forwarding communication capability.

In some aspects, the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

In some aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Some aspects described herein relate to an apparatus for wireless communication. The apparatus may include means for transmitting a capability report that includes an indication of one or more capabilities of the apparatus, wherein the capability report includes one or more of a duplexing mode report, an indication of one or more latency values associated with one or more processing modes of the apparatus, or an indication of a duplexing communication capability of the apparatus. The apparatus may include means for receiving, from a control node, a configuration, for a digital repeating operation, that is based at least in part on the capability report.

In some aspects, the apparatus includes means for performing the digital repeating operation based at least in part on the configuration for the repeating operation.

In some aspects, the means for performing the digital repeating operation comprises: means for receiving, from a first wireless node, a signal; means for digitally processing the signal; means for regenerating the signal to form a regenerated signal based at least in part on digitally processing the signal; and means for transmitting, to a second wireless node, the regenerated signal.

In some aspects, the duplexing mode report includes an indication of the one or more duplexing modes supported by the apparatus, and the duplexing mode report includes one or more of an indication of a self-interference delay, an indication of a buffering capability, an indication of a forwarding latency, or an indication of a power consumption of the apparatus when operating in the one or more duplexing modes.

In some aspects, the self-interference delay of the apparatus comprises a sum of a clutter echo round trip time and a processing latency of an incoming signal.

In some aspects, the buffering capability of the apparatus is based at least in part on an amount of data that the apparatus can store.

In some aspects, the power consumption of the apparatus is based at least in part on an amount of power consumed when operating in the one or more duplexing modes.

In some aspects, the means for transmitting the capability report comprises: means for receiving, from the control node, an initial configuration for the digital repeating operation; and means for transmitting, to the control node, the capability report based at least in part on the apparatus being unable to support the initial configuration.

In some aspects, the means for transmitting the capability report comprises: means for transmitting, during an initial capability exchange with the control node, the capability report.

In some aspects, the means for transmitting the capability report comprises: means for transmitting, to the control node, an indication that the apparatus supports a conditional full-duplex communication capability associated with at least one of: one or more antenna array pairs, or one or more beam pairs.

In some aspects, the duplexing communication capability of the apparatus is at least one of: a half-duplex communication capability, a full-duplex communication capability, a conditional full-duplex communication capability, or a full-duplex forwarding communication capability.

In some aspects, the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

In some aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Some aspects described herein relate to an apparatus for wireless communication. The apparatus may include means for receiving, from a repeater node, a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The apparatus may include means for transmitting, to the repeater node, a configuration, for a digital repeating operation, that is based at least in part on the capability report.

In some aspects, the apparatus includes means for determining the configuration based at least in part on the capability report.

In some aspects, the duplexing mode report includes an indication of the one or more duplexing modes supported by the repeater node, and the duplexing mode report includes one or more of an indication of a self-interference delay, an indication of a buffering capability, an indication of a forwarding latency, or an indication of a power consumption of the repeater node when operating in the one or more duplexing modes.

In some aspects, the self-interference delay of the repeater node comprises a sum of a clutter echo round trip time and a processing latency of an incoming signal.

In some aspects, the buffering capability of the repeater node is based at least in part on an amount of data that the repeater node can store.

In some aspects, the power consumption of the repeater node is based at least in part on an amount of power consumed when operating in the one or more duplexing modes.

In some aspects, the means for receiving the capability report comprises: means for transmitting, to the repeater node, an initial configuration for the digital repeating operation; and means for receiving, from the repeater node, the capability report based at least in part on the repeater node being unable to support the initial configuration.

In some aspects, the means for receiving the capability report comprises: means for receiving, during an initial capability exchange with the repeater node, the capability report.

In some aspects, the means for receiving the capability report comprises: means for receiving, from the repeater node, an indication that the repeater node supports a conditional full-duplex communication capability associated with at least one of: one or more antenna array pairs, or one or more beam pairs.

In some aspects, the duplexing communication capability of the repeater node is at least one of: a half-duplex communication capability, a full-duplex communication capability, a conditional full-duplex communication capability, or a full-duplex forwarding communication capability.

In some aspects, the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

In some aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
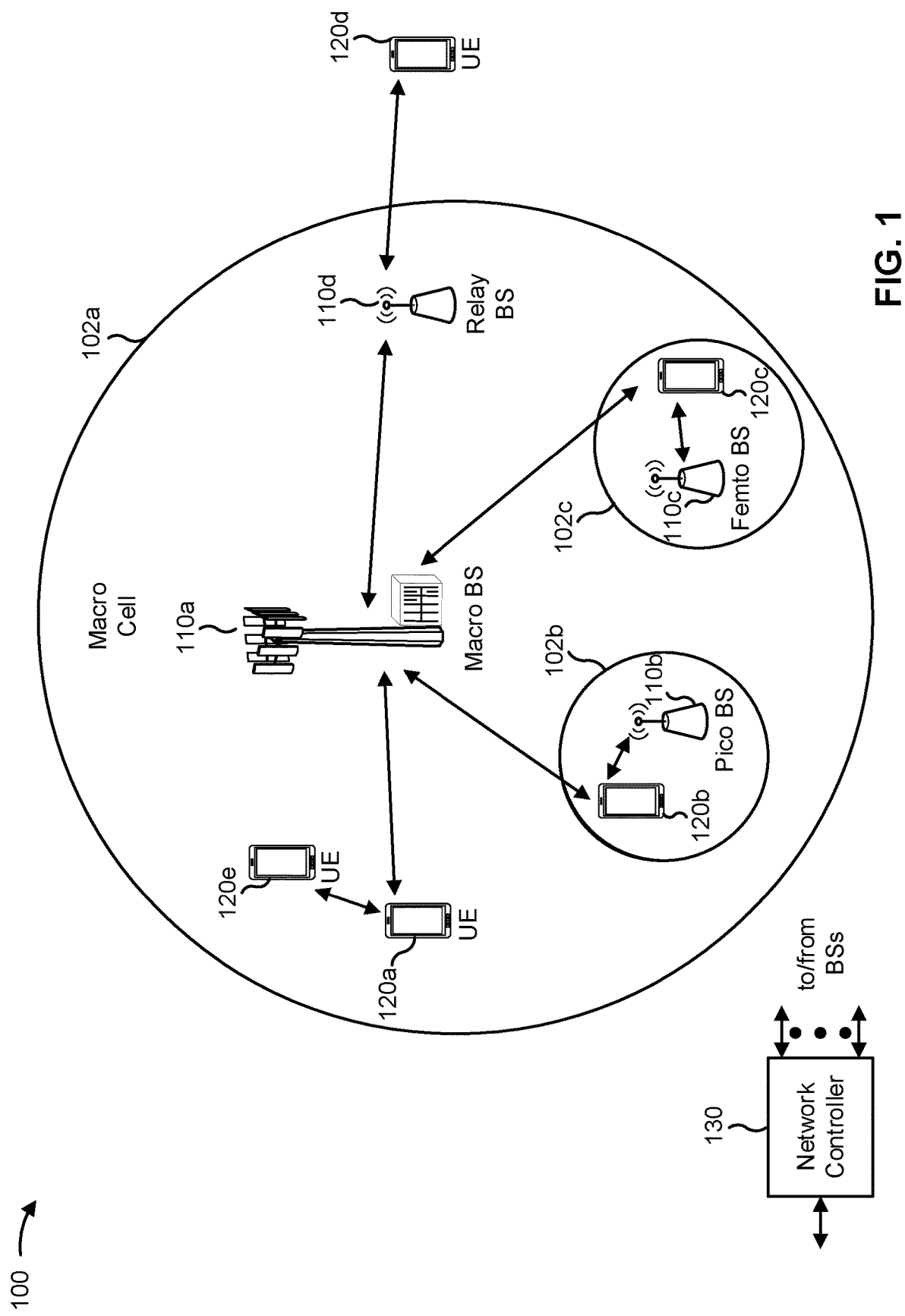
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or a Long Term Evolution (LTE) network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
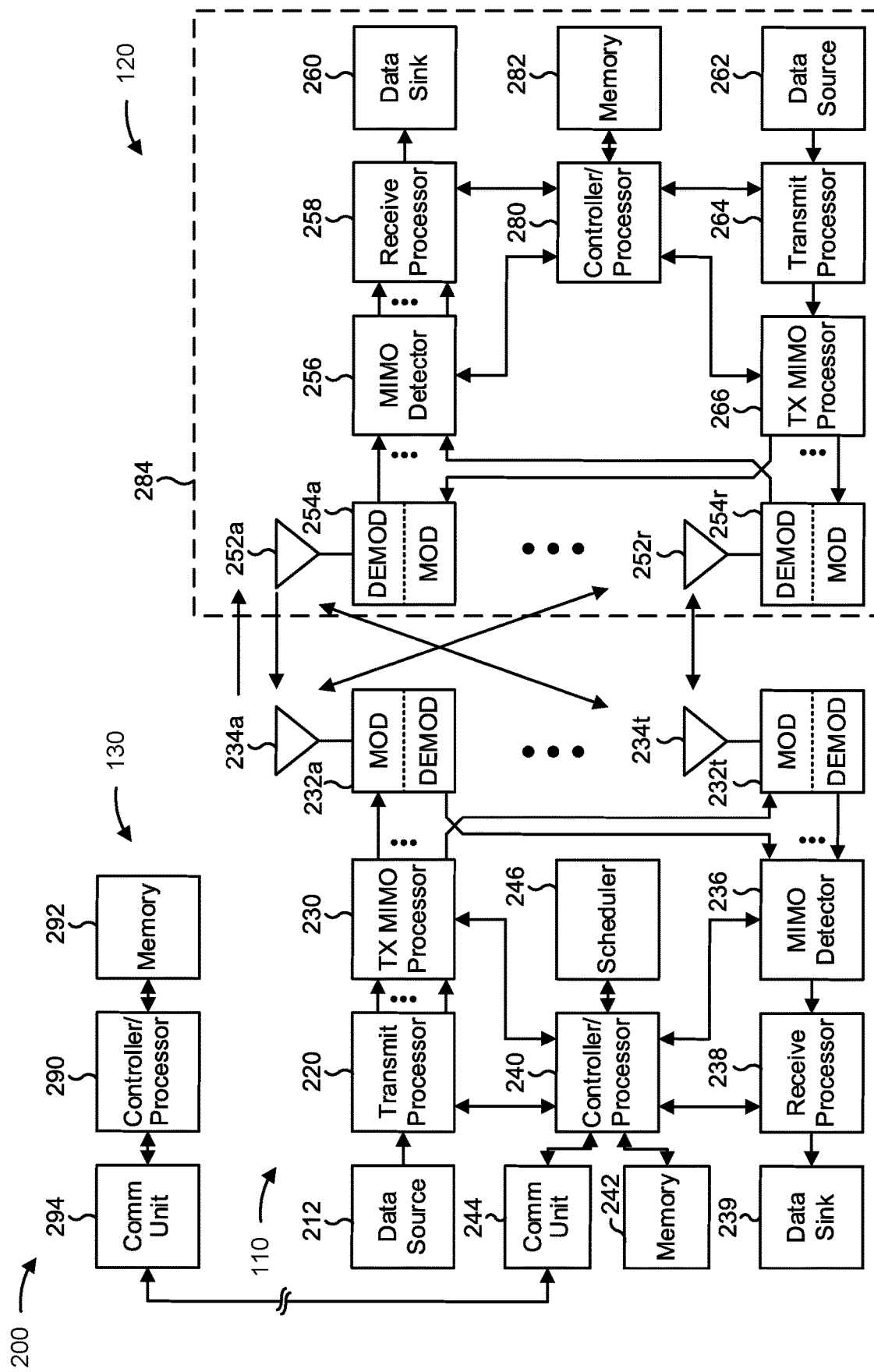
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with reporting a repeater communication capability, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. In some aspects, executing instructions may include running the instructions, converting the instructions, compiling the instructions, and/or interpreting the instructions.

In some aspects, a repeater node (e.g., a repeater device, a base station 110, a UE 120, and/or the like) may include means for transmitting, to a control node, an indication of a duplexing communication capability of the wireless node, means for receiving, from the control node, a configuration, for a repeating operation, that is based at least in part on the duplexing communication capability of the wireless node, means for performing the repeating operation based at least in part on the configuration for the repeating operation, and/or the like. In some aspects, the repeater node may include means for transmitting a duplexing mode report that includes an indication of one or more duplexing modes supported by the repeater node, wherein the duplexing mode report includes one or more of an indication of a self-interference delay, an indication of a buffering capability, an indication of a forwarding latency, or an indication of a power consumption of the repeater node when operating in the one or more duplexing modes; means for receiving, from a control node, an indication of a duplexing mode to use for forwarding a signal; and/or the like. In some aspects, the repeater node may include means for means for determining one or more latency values associated with one or more processing modes for repeating a signal; means for transmitting, to a control node, an indication of the one or more latency values associated with the one or more processing modes for repeating the signal; and/or the like. In some aspects, the repeater node may include means for transmitting a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node; means for receiving, from a control node, a configuration, for a digital repeating operation, that is based at least in part on the capability report, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a control node (e.g., a base station 110, an integrated access and backhaul (IAB) donor, an IAB node, and/or the like) may include means for receiving, from a repeater node, an indication of a duplexing communication capability of the repeater node, means for transmitting, to the repeater node, a configuration for a repeating operation that is based at least in part on the duplexing communication capability of the repeater node, and/or the like. In some aspects, the control node may include means for receiving, from a repeater node, a duplexing mode report that includes an indication of one or more duplexing modes supported by the repeater node, wherein the duplexing mode report includes one or more of an indication of a self-interference delay, an indication of a buffering capability, an indication of a forwarding latency, or an indication of a power consumption of the repeater node when operating in the one or more duplexing modes; means for transmitting, to the repeater node, an indication of a duplexing mode for the repeater node to use for forwarding a signal; and/or the like. In some aspects, the control node may include means for receiving, from a repeater node, an indication of one or more latency values associated with to one or more processing modes for repeating a signal; means for determining one or more parameters for transmitting the signal to the repeater node for repeating; and/or the like. In some aspects, the control node may include means for receiving, from a repeater node, a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node; means for transmitting, to the repeater node, a configuration, for a digital repeating operation, that is based at least in part on the capability report; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
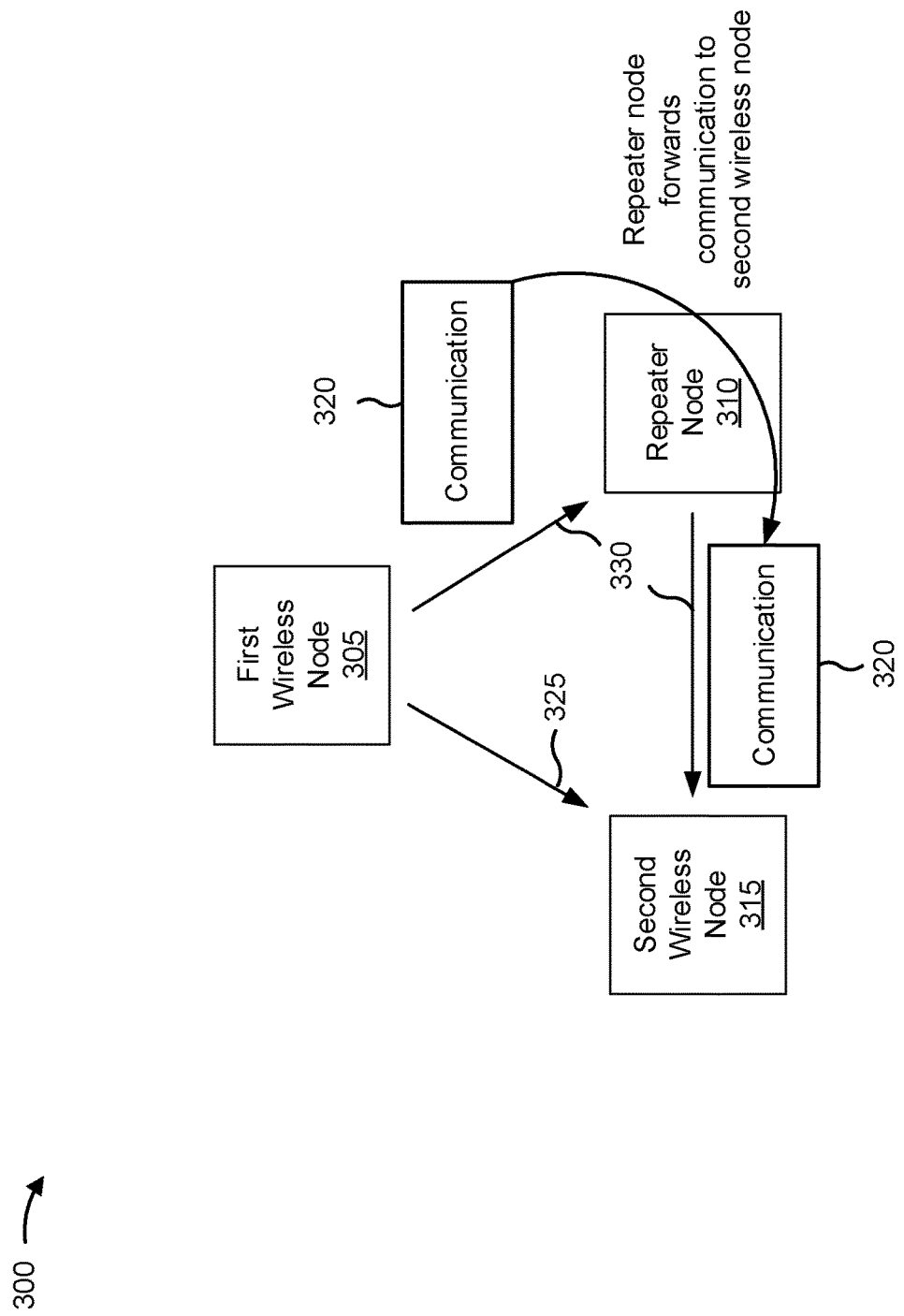
FIG. 3 is a diagram illustrating an example of a repeater node that forwards communications between a first wireless node and a second wireless node, in accordance with the present disclosure.

FIG. 3 is a diagram illustrating an example 300 of a repeater node (also referred to herein as a "repeater") that forwards communications between a first wireless node and a second wireless node, in accordance with the present disclosure. As shown, example 300 includes a first wireless node 305 (e.g., an IAB node, an IAB donor, a base station 110, and UE 120, and/or the like), a repeater node 310 (e.g., a repeater device, a base station 110, a UE 120, a millimeter wave repeater, a digital repeater, an analog repeater, and/or the like), and a second wireless node 315 (e.g., an IAB node, an IAB donor, a base station 110, and UE 120, another repeater node 310, and/or the like). In example 300, the first wireless node 305 and/or a second wireless node may be aware of the repeater node 310. In some aspects, the first wireless node 305 and/or a second wireless node may be unaware of the repeater node 310.

As shown in FIG. 3, the first wireless node 305 may want to transmit a communication 320 (e.g., a data communication, a control communication, and/or the like) to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like.

Therefore, the first wireless node 305 may communicate with the second wireless node 315 using an indirect link 330. For example, the first wireless node 305 may transmit the communication 320 to the repeater node 310. In some aspects, the first wireless node 305 may transmit the communication 320 directly to the repeater node 310 (e.g., when the first wireless node 305 is aware of the repeater node 310). In some aspects, the repeater node 310 may be configured (e.g., by a control node, by the second wireless node 315, and/or the like) to receive the communication 320 from the first wireless node 305 (e.g., when the first wireless node 305 is unaware of the repeater node 310).

As shown in FIG. 3, the communication 320 may pass through the repeater node 310 and be forwarded by the repeater node 310. For example, the repeater node 310 may receive the communication 320 and may re-generate a signal of the communication 320 based at least in part on the communication 320. In some cases, an indirect link 330 may be an access link, a side link, or a fronthaul link. For example, if the first wireless node 305 is a base station 110 and the second wireless node 315 is a UE 120, the indirect link 330 between the first wireless node 305 and the repeater node 310 may be a fronthaul link. The indirect link 330 between the repeater node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

As indicated above, FIG. 3 is provided as an example. Other examples may differ from what is described with respect to FIG. 3.

Figure 4:
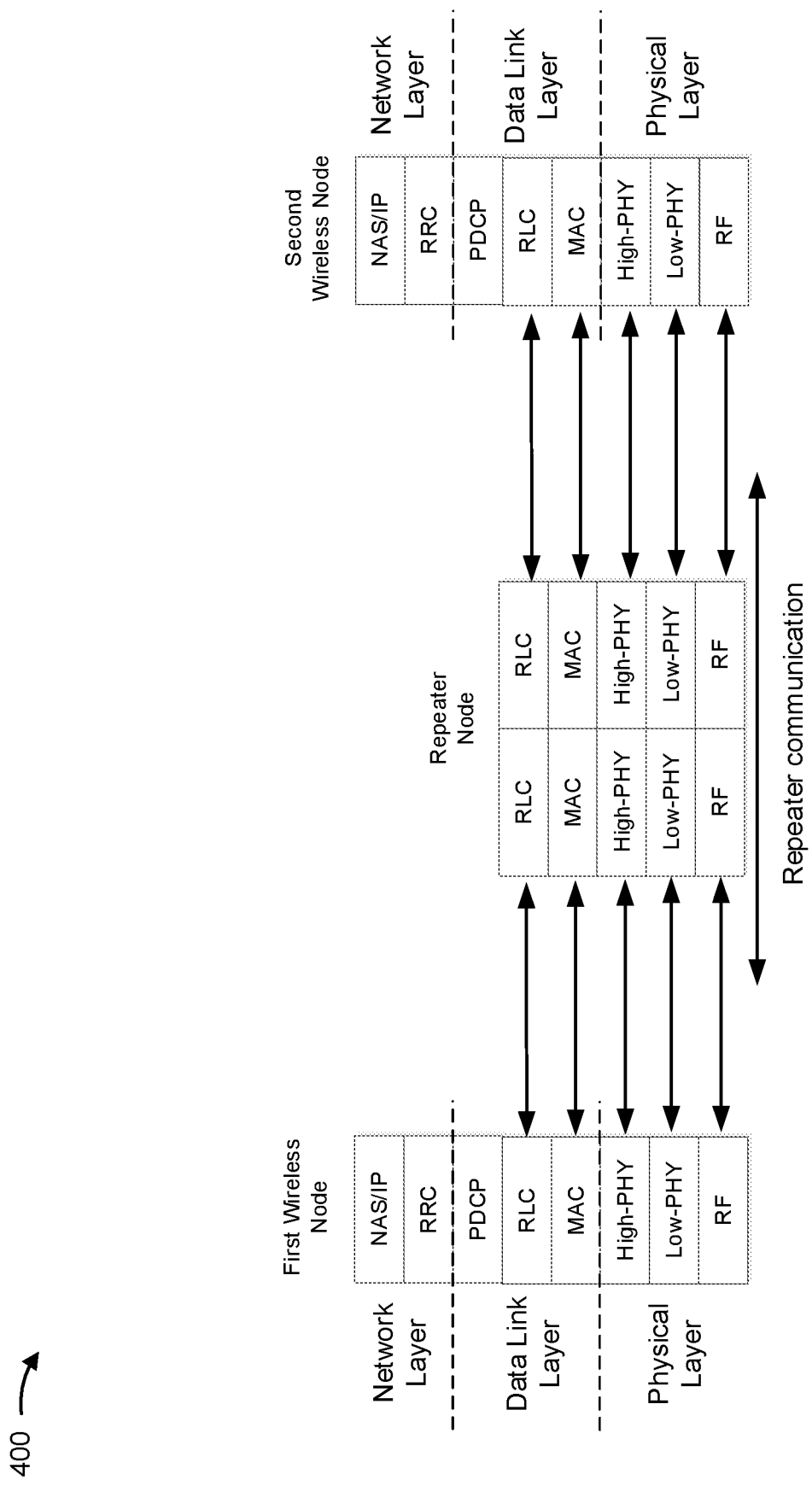
FIG. 4 is a diagram illustrating an example of a protocol stack for repeating communications between a first wireless node and a second wireless node, in accordance with the present disclosure.

FIG. 4 is a diagram illustrating an example 400 of a protocol stack for repeating communications between a first wireless node and second wireless node, in accordance with the present disclosure. In some aspects, the first wireless node may be the first wireless node 305 and the second wireless node may be the second wireless node 315. In some aspects, the first wireless node and the second wireless node may communicate with a repeater node (e.g., repeater node 310 and/or the like).

As shown in FIG. 4, an NR protocol stack implemented on a first wireless node and on a second wireless node includes a network layer (e.g., Layer 3), a data link layer (e.g., Layer 2) and a physical layer (e.g., Layer 1). The network layer may include a non-access stratum (NAS) layer, an internet protocol (IP) layer, a radio resource control (RRC) layer, and/or the like. The data link layer may include a packet data convergence protocol (PDCP) layer, a radio link control (RLC), a medium access control (MAC), and/or the like. The physical layer may include a high-physical (PHY) layer, a low-PHY layer, a radio frequency (RF) layer, and/or the like. In some aspects, the PDCP layer on a wireless node may include an adaptation sub-layer (e.g., a service data adaptation protocol (SDAP) sub-layer) and/or the like.

In some aspects, such as in an IAB network, the NAS layer, the IP layer, the RRC layer, the PDCP layer, and/or the like may be included in a central unit (CU) of an IAB donor. The remaining layers (e.g., the RLC layer, the MAC layer, the high-PHY layer, the low-PHY layer, the RF layer, and/or the like) may be included in a distributed unit (DU) of an IAB donor and/or of an IAB node.

When communicating directly with the second wireless node, the first wireless node may communicate at an RLC layer, a MAC layer, a high-PHY layer, a low-PHY layer, an RF layer, and/or the like. As shown in FIG. 4, the layers in the first wireless node may communicate with corresponding layers in the second wireless node. However, in a repeating scenario, the first wireless node may communicate via a link (e.g., an access link, a fronthaul link, and/or the like) with a repeater node. For example, to enable Layer 2 repeating (e.g., data link layer repeating) between the first wireless node and the second wireless node, the repeater node may include an RLC layer, a MAC layer, a high-PHY layer, a low-PHY layer, and an RF layer to communicate with a corresponding RLC layer, MAC layer, high-PHY layer, low-PHY layer, and RF layer of the first wireless node and second wireless node. Based at least in part on passing information between these layers, the repeater node enables Layer 2 repeating between the first wireless node and the second wireless node.

In some aspects, the repeater node may utilize Layer 1 repeating (e.g., physical layer repeating). For example, the repeater node may not include an RLC layer or a MAC layer. As the repeater node may not include an RLC or MAC layer, the repeater node may be configured and/or scheduled by a control node (e.g., a CU, an IAB donor, and IAB node, a base station 110, the first wireless node, the second wireless node, and/or the like). The repeater node may communicate with the first wireless node and the second wireless node at the physical layer only (e.g., rather than the data link layer and the physical layer). Based at least in part on passing information between these layers, the repeater node enables Layer 1 repeating between the first wireless node and the second wireless node.

As indicated above, FIG. 4 is provided as an example. Other examples may differ from what is described with respect to FIG. 4.

Figure 5:
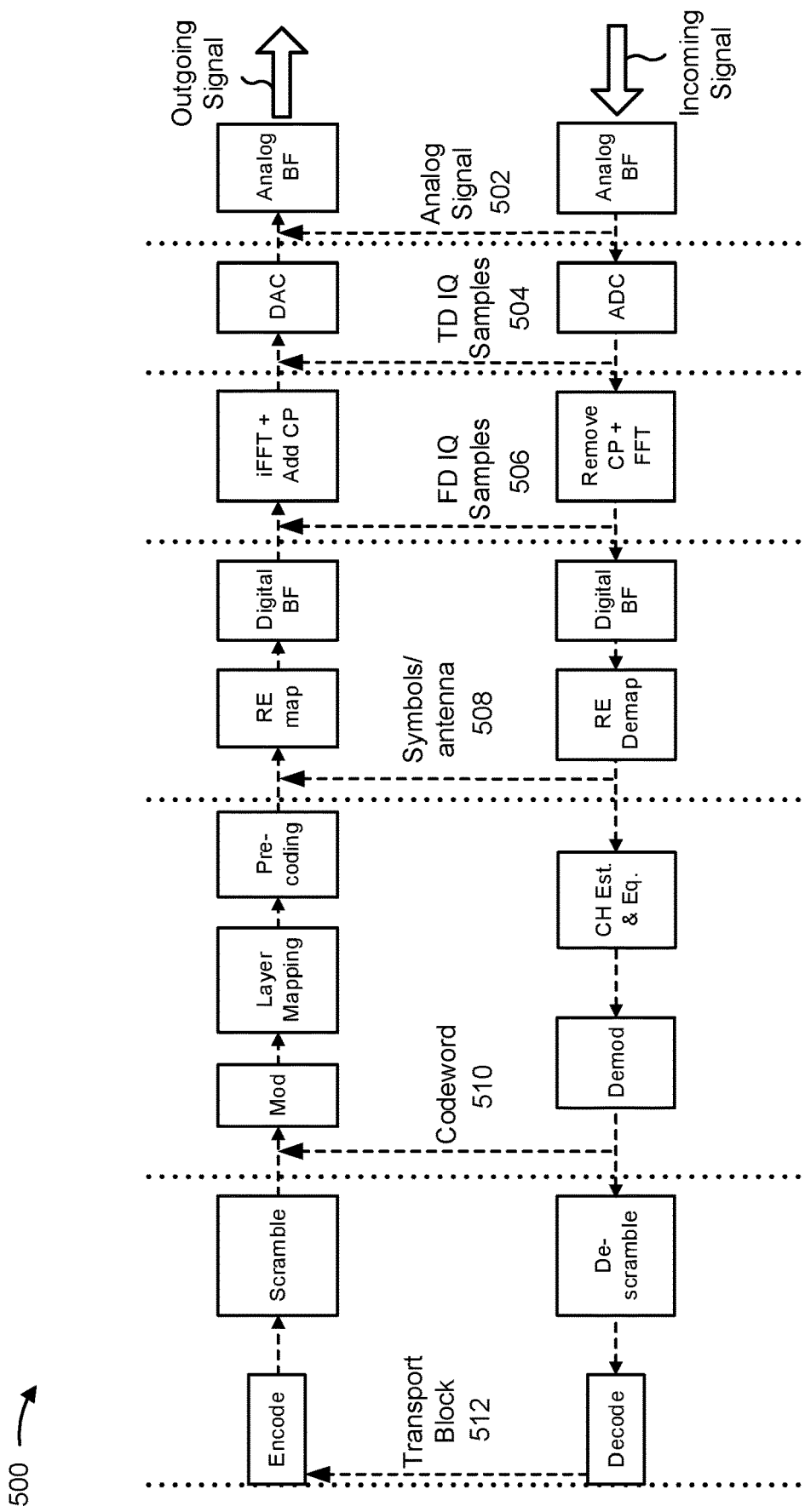
FIG. 5 is a diagram illustrating an example of processing operations for a repeating operation performed by a repeater node, in accordance with the present disclosure.

FIG. 5 is a diagram illustrating an example 500 of processing operations for a repeating operation performed by a repeater node, in accordance with the present disclosure. A repeating operation may include a repeater node receiving a signal from a first wireless node, processing the signal, re-generating the same signal based at least in part on the processing of the signal, or transmitting the re-generated signal to a second wireless node. In this way, the repeater node may repeat the signal received from the first wireless node to the second wireless node.

As shown by reference number 502, the repeater node may receive an incoming signal from a first wireless node and may perform an analog beamforming procedure to obtain an analog signal associated with the incoming signal. The repeater node may extract the analog signal and may re-generate the analog signal in a transmit (Tx) chain of the repeater node. For example, the repeater node may perform an analog beamforming procedure on the analog signal to form the outgoing signal (e.g., the repeater may boost the analog signal, apply an analog beamforming gain, and/or the like). The repeater node may transmit the outgoing signal to a second wireless node. A repeater node that operates in this manner may be referred to as an analog repeater device (e.g., as the incoming signal is not converted from the analog domain to the digital domain).

As shown by reference number 504, after receiving the incoming signal and performing an analog beamforming procedure associated with the incoming signal, the repeater node may convert the incoming signal from the analog domain to the digital domain using an analog-to-digital converter (ADC). After converting the incoming signal from the analog domain to the digital domain, the repeater node may determine one or more time domain in-phase/quadrature (IQ) samples associated with the incoming signal. The repeater node may extract the time domain IQ samples and may store the time domain IQ samples in a buffer of the repeater node. The repeater node may use the time domain IQ samples to regenerate the incoming signal in the Tx chain of the repeater node (e.g., immediately after extracting the time domain IQ samples or at a later time). For example, the repeater node may convert the time domain IQ samples from the digital domain to the analog domain using a digital-to-analog converter (DAC). The repeater node may perform an analog beamforming procedure on the analog signal to form the outgoing signal. The repeater node may transmit the outgoing signal to a second wireless node.

As shown by reference number 506, after converting the incoming signal from the analog domain to the digital domain, the repeater node may remove a cyclic prefix (CP) associated with the incoming signal and perform a fast-Fourier transform (FFT) on the incoming signal. After removing the CP and performing the FFT associated with the incoming signal, the repeater node may determine one or more frequency domain IQ samples associated with the incoming signal. The repeater node may extract the frequency domain IQ samples and may store the frequency domain IQ samples in a buffer of the repeater node. The repeater node may use the frequency domain IQ samples to regenerate the incoming signal in the Tx chain of the repeater node (e.g., immediately after extracting the frequency domain IQ samples or at a later time). For example, the repeater node may perform an inverse FFT (iFFT) operation on the frequency domain IQ samples, in order to generate time domain IQ samples. The repeater node may add a CP to the time domain IQ samples. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 508, after removing the CP and performing FFT associated with the incoming signal, the repeater node may perform a digital beamforming procedure associated with the incoming signal. The repeater node may perform a resource element (RE) de-mapping operation associated with the incoming signal. After performing the digital beamforming procedure and the RE de-mapping procedure, the repeater node may determine one or more IQ samples of occupied tones (e.g., a quantity of symbols per antenna element) associated with the incoming signal. The repeater node may extract the IQ samples of occupied tones and may store the IQ samples of occupied tones in a buffer of the repeater node. The repeater node may use the IQ samples of occupied tones to regenerate the incoming signal in the Tx chain of the repeater node (e.g., immediately after extracting the IQ samples of occupied tones or at a later time). For example, the repeater node may perform an RE mapping procedure (e.g., the inverse of the RE de-mapping procedure) associated with the IQ samples of occupied tones. The repeater node may perform a digital beamforming procedure associated with the IQ samples of occupied tones. After performing the digital beamforming procedure, the repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 510, after performing the digital beamforming procedure and the RE de-mapping operation, the repeater node may perform channel estimation and equalization associated with the incoming signal (e.g., to determine and/or remove noise and wireless channel variations associated with the incoming signal). The repeater node may perform a demodulation operation associated with the incoming signal. After performing channel estimation and equalization and the demodulation operation, the repeater node may determine a codeword associated with the incoming signal. The repeater node may extract the codeword and may store the codeword in a buffer of the repeater node. The repeater node may use the codeword to regenerate the incoming signal in the Tx chain of the repeater node (e.g., immediately after extracting the codeword or at a later time). For example, the repeater node may perform a modulation operation, a layer mapping operation, a pre-coding operation, an RE-mapping operation, and/or a digital beamforming procedure associated with the codeword. The repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 512, after performing the channel estimation and equalization and demodulation operation associated with the incoming signal, the repeater node may perform a de-scrambling operation (e.g., using scrambling identifiers associated with the incoming signal). The repeater node may decode the incoming signal in accordance with a network coding scheme associated with the incoming signal. After decoding the incoming signal, the repeater node may determine a transport block associated with the incoming signal. The repeater node may extract the transport block and may store the transport block in a buffer of the repeater node. The repeater node may use the transport block to regenerate the incoming signal in the Tx chain of the repeater node (e.g., immediately after extracting the transport block or at a later time). For example, the repeater node may encode the transport block (e.g., in accordance with the network coding scheme) and scramble the encoded transport block. The repeater node may perform a modulation operation, a layer mapping operation, a pre-coding operation, an RE-mapping operation, and/or a digital beamforming procedure associated with the scrambled transport block. The repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

The different operations described above may be configured by a control node associated with the repeater node. For example, a level of processing (e.g., as shown by reference numbers 502, 504, 506, 508, 510, and 512) may be indicated to the repeater node by the control node. A repeater node that performs processing of an incoming signal after converting the signal to the digital domain may be referred to as a digital repeater device. For example, a repeater node that performs the operations described above with respect to reference numbers 504, 506, 508, 510, or 512 may be referred to as a digital repeater device.

The number and arrangement of components shown in FIG. 5 is provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

In some wireless networks, functions of a repeater node may be controlled and/or configured by a control node. For example, the control node may indicate a level of processing to be performed by the repeater node, how the repeater node is to repeat communications, which resources the repeater node is to use associated with repeating communications, a beamforming configuration associated with repeating communications, when the repeater node is to repeat communications, and/or the like. In some cases, a repeater node may support different types of communication modes (e.g., half-duplex communication modes, full-duplex communication modes, and/or the like). As a result, in some cases, the repeater node may be unable to support a configuration indicated by the control node. This may negatively impact network performance as the repeater node may be unable to perform repeating operations indicated by the control node.

In some wireless networks, a repeater node (also referred to herein as a "repeater") may support multiple duplexing modes. For example, the repeater node may support full-duplex operation, full-duplex forwarding (e.g., forwarding with almost-zero-delay), half duplex operation, and/or the like. A control node may configure the repeater node to operate in a supported duplexing mode based at least in part on communications between a transmitter node (e.g., the control node) and a receiver node via the repeater node. However, the control node may not be aware of conditions local to the repeater node. The conditions local to the repeater node may cause a loss of signal quality (e.g., signal-to-interference-plus-noise) in a forwarded signal. For example, self-interference (SI) may degrade a signal received by the repeater node. The degradation of the signal may cause communication errors for communications between the control node and a receiver node, which may consume network, computer, and communication resources to detect and/or correct. In some examples, the repeater node may introduce a delay between receiving the signal and transmitting the signal based at least in part on processing capabilities of the repeater node, performance of the one or more processing operations, and/or the like. The delay may cause communication errors for communications between the control node and a receiver node, which may consume network, computer, and communication resources to detect and/or correct.

Some techniques and apparatuses described herein enable reporting a repeater duplexing communication capability. For example, the repeater node may determine a duplexing communication capability of the repeater node (e.g., half-duplex communication capability, full-duplex communication capability, and/or the like). The repeater node may indicate the duplexing communication capability of the repeater node to the control node along with any conditions applicable to the duplexing communication capability of the repeater node. The control node may determine a configuration associated with repeating operations to be performed by the repeater node based at least in part on the duplexing communication capability of the repeater node. As a result, the control node may be enabled to configure the repeater node in accordance with the duplexing communication capability of the repeater node. Configuring the repeater node in accordance with the duplexing communication capability of the repeater node may improve network performance and reliability as the control node may ensure that the repeater node is capable of supporting the indicated repeating operations. Additionally, or alternatively, configuring the repeater node in accordance with the duplexing communication capability of the repeater node may improve network performance and reliability as the control node may be enabled to configure higher performance repeating operations (e.g., using a full-duplex communication mode, a full-duplex forwarding communication mode, and/or the like) than would have otherwise been used had the repeater node not indicated the duplexing communication capability of the repeater node.

In some aspects described herein, a repeater node may transmit a duplexing mode report that includes an indication of one or more duplexing modes supported by the repeater node. The duplexing mode report may also include one or more of an indication of a self-interference delay, an indication of a buffering capability, an indication of a forwarding latency, or an indication of a power consumption of the repeater node when operating in the one or more duplexing modes. In some aspects, a control node may determine a duplexing mode for the repeater node to use based at least in part on a processing latency of the repeater node, the self-interference delay, the buffering capability, the forwarding latency, the power consumption, and/or the like associated with the one or more duplexing modes. In some aspects, the control mode may determine the duplexing mode for the repeater node to use based at least in part on a required quality of service associated with a signal to be forwarded via the repeater node.

Based at least in part on the repeater node transmitting the duplexing mode report, the control node may determine a duplexing mode for the repeater node, timing for transmitting a signal to be forwarded, a schedule for a receiving node to receive the signal from the repeater node, and/or the like. In this way, the control node may avoid or reduce communication errors, which may conserve network, computer, and communication resources that may otherwise have been used to detect and/or correct.

In some aspects described herein, a repeater node (e.g., a digital repeater) may transmit, to a control node, an indication of one or more latency values associated with one or more processing modes for repeating a signal. In some aspects, the repeater node may support different functionalities (e.g., a different set of the one or more processing operations) and may report multiple latency values that are associated with the different functionalities. In some aspects, the one or more latency values may be based at least in part on a type of signal to be repeated (e.g., a reference signal, a data channel, a number of symbols of the signal, occupied bandwidth, an MCS of the signal, and/or the like). In some aspects, the latency values may be based at least in part on an expected first time (e.g., a time at a start of reception of the signal, a time at a completion of reception of the signal, a time at a reception of a command to repeat the signal) and an expected second time (e.g., a time at a start of transmission of a regeneration of the signal, a time at a start of reception and/or processing of the signal, and/or the like).

Based at least in part on the repeater node transmitting an indication of one or more latency values, the control node may determine timing for transmitting the signal, a schedule for a receiving node to receive the signal from the repeater node, a selected amount of processing for the repeater node to perform on the signal, and/or the like. In this way, the control node may avoid or reduce communication errors that are based at least in part on latency of the repeater node, which may conserve network, computer, and communication resources that may otherwise have been used to detect and/or correct.

Figure 6:
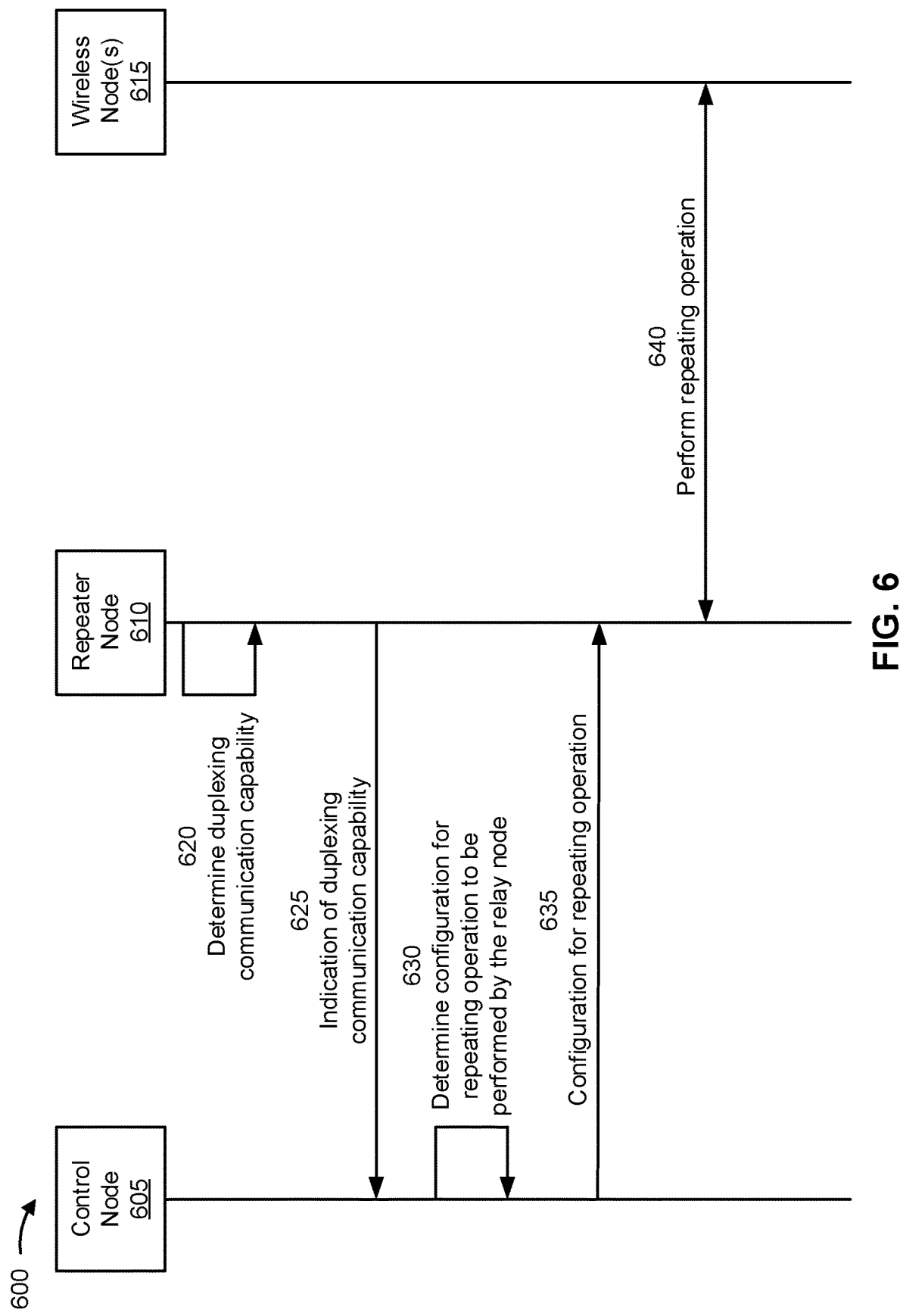
FIG. 6 is a diagram illustrating an example associated with reporting a repeater duplexing communication capability, in accordance with the present disclosure.

FIG. 6 is a diagram illustrating an example 600 associated with reporting a repeater duplexing communication capability, in accordance with the present disclosure. As shown in FIG. 6, a control node 605, a repeater node 610, and one or more wireless nodes 615 may communicate with one another in a wireless network (e.g., wireless network 100). In some aspects, the control node 605 may be a base station 110, a CU of an IAB donor, a DU of an IAB node, an IAB node, and/or the like. In some aspects, the repeater node 610 may be a repeater device, a remote unit of an IAB node, a repeater station, a Layer 1 repeater device, a millimeter wave repeater device, a digital repeater device, an analog repeater device, a base station 110, a UE 120, an IAB node, and/or the like. In some aspects, the one or more wireless nodes 615 may be a base station 110, a UE 120, an IAB donor, an IAB node, another repeater node 610, the control node 605, and/or the like. In some aspects, the repeater node 610 may communicate with a plurality of wireless nodes 615. In some aspects, the repeater node 610 may communicate with a plurality of control nodes 605.

As shown by reference number 620, the repeater node 610 may determine a duplexing communication capability of the repeater node 610. The duplexing communication capability of the repeater node 610 may be a half-duplex communication capability, a full-duplex communication capability, a conditional full-duplex communication capability, a full-duplex forwarding communication capability, and/or the like. A half-duplexing communication capability may indicate that the repeater node 610 may support one of receiving communications or transmitting communications at a time (e.g., indicating that the repeater node 610 may not support receiving and transmitting communications at the same time).

A full-duplex communication capability may indicate that the repeater node 610 may support receiving and transmitting communications at the same time. A conditional full-duplex communication capability may indicate one or more conditions that apply to the repeater node 610's ability to support full-duplex communication (e.g., indicating beam pairs that support full-duplex communication, antenna array pairs that support full-duplex communication, and/or the like).

A full-duplex forwarding communication capability may indicate that the repeater node 610 supports repeating a communication with little to no delay. For example, the repeater node 610 may be capable of receiving a signal, regenerating the signal, and transmitting the regenerated signal (e.g., as described above with respect to FIG. 5) with little to no delay. That is, the repeater node 610 may be capable of receiving a signal during a first time period and transmitting a regenerated signal associated with the signal during a second time period that at least partially overlaps with the first time period.

The repeater node 610 may determine the duplexing communication capability of the repeater node 610 based at least in part on a stored configuration (e.g., a factory configuration, a pre-configuration, a received configuration, and/or the like indicating the duplexing communication capability of the repeater node 610). The repeater node 610 may determine the duplexing communication capability of the repeater node 610 based at least in part on an antenna array configuration associated with the wireless node (e.g., and a beam configuration associated with the antenna array configuration).

The repeater node 610 may determine the duplexing communication capability of the repeater node 610 based at least in part on a digital processing configuration associated with a repeating operation to be performed by the repeater node 610. For example, at certain levels of digital processing, the repeater node 610 may be capable of supporting a full-duplex forwarding communication capability. However, at other levels of digital processing, the repeater node 610 may not be capable of supporting a full-duplex forwarding communication capability due to a delay associated with performing the digital processing. For example, the repeater node 610 may support a full-duplex forwarding communication capability if a level of digital processing to be performed by the repeater node 610 is similar to that as described above with respect to reference numbers 504, 506, and/or the like of FIG. 5. However, the repeater node 610 may not support a full-duplex forwarding communication capability if a level of digital processing to be performed by the repeater node 610 is similar to that as described above with respect to reference numbers 510, 512, and/or the like of FIG. 5.

In some aspects, the repeater node 610 may determine the duplexing communication capability of the repeater node 610 based at least in part on an active antenna array configuration associated with repeater node 610. For example, the repeater node may determine beam pairs, antenna array pairs, and/or the like that are suitable for full-duplex communication (e.g., based at least in part on performing self-interference measurements and/or the like). In some aspects, a conditional full-duplex communication capability may indicate one or more beam pairs, one or more antenna array pairs, and/or the like that are suitable for full-duplex communication.

In some aspects, the repeater node 610 may determine that communications associated with a single antenna array may only support half-duplex communications. For example, the repeater node 610 may determine that, if communications are to be transmitted and received using the same antenna array, then the repeater node 610 supports a half-duplex communication capability with respect to those communications.

In some aspects, the repeater node 610 may determine that the repeater node 610 does support a full-duplex forwarding communication capability. For example, the repeater node 610 may determine that the repeater node 610 is capable of performing operations described above with respect to FIGS. 3 and 5 with minimal processing latency delay.

In some aspects, the repeater node 610 may determine that the repeater node 610 does not support a full-duplex forwarding communication capability (e.g., based at least in part on a level of processing to be performed, a buffering capability or configuration of the repeater node 610, and/or the like), but that the repeater node 610 does support a full-duplex communication capability. For example, the repeater node 610 may be capable of simultaneously receiving a first signal and transmitting another unrelated signal (e.g., that has been regenerated based at least in part on another signal that was previously received by the repeater node 610).

As shown by reference number 625, the repeater node 610 may transmit, to the control node 605, an indication of the duplexing communication capability of the repeater node 610. In some aspects, the repeater node 610 may transmit the indication of the duplexing communication capability in a capability report. The indication of the duplexing communication capability of the repeater node 610 may indicate whether the repeater node 610 supports half-duplex communication or full-duplex communication. The indication of the duplexing communication capability of the repeater node 610 may indicate conditions applicable to full-duplex communications (e.g., one or more antenna arrays of the repeater node 610 that can be used for full-duplex communication, one or more beam pairs of the repeater node 610 that can be used for full-duplex communication, and/or the like). The indication of the duplexing communication capability of the repeater node 610 may indicate whether the repeater node 610 supports a full-duplexing forwarding communication mode.

In some aspects, the repeater node 610 may transmit the indication of the duplexing communication capability of the repeater node 610 as part of an initial capability exchange with the control node 605. For example, the repeater node 610 may transmit the indication of the duplexing communication capability of the repeater node 610 during an initial capability or configuration exchange with the control node 605.

In some aspects, the repeater node 610 may transmit the indication of the duplexing communication capability of the repeater node 610 in response to a request from the control node 605. For example, the repeater node 610 may receive, from the control node 605, a request to provide the indication of the duplexing communication capability. The repeater node 610 may transmit the indication of the duplexing communication capability of the repeater node 610 based at least in part on receiving the request to provide the indication of the duplexing communication capability.

In some aspects, the repeater node 610 may transmit the indication of the duplexing communication capability of the repeater node 610 in response to a command or a configuration received from the control node 605 (or another wireless node, such as wireless nodes 615) that indicates that the repeater node 610 is to adopt a communication mode that is not supported by the repeater node 610. For example, the repeater node 610 may receive, from the control node 605 (or another wireless node, such as wireless nodes 615), a configuration for a repeating operation indicating a duplex operating mode for the repeater node 610. The repeater node 610 may determine that the repeater node is not capable of supporting the duplex operating mode indicated by the configuration. The repeater node 610 may transmit, to the control node 605, an indication that the repeater node 610 is not capable of supporting the duplex operating mode.

In some aspects, the indication that the repeater node 610 is not capable of supporting the duplex operating mode may indicate the duplexing communication capability of the repeater node 610. In some aspects, the indication that the repeater node 610 is not capable of supporting the duplex operating mode may indicate that the requested duplexing mode is not supported (e.g., and not indicate the duplexing communication capability of the repeater node 610).

As shown by reference number 630, the control node 605 may determine a configuration for a repeating operation to be performed by the repeater node 610 based at least in part on the duplexing communication capability of the repeater node 610. For example, the control node 605 may schedule communications, provide a beamforming configuration for communications, indicate beam pairs for communications, indicate a processing level to be performed, and/or the like based at least in part on the duplexing communication capability of the repeater node 610.

For example, if the control node 605 determines that the repeater node 610 is to perform a repeating operation while operating in a full-duplex communication mode, the control node 605 may configure the repeater node 610 to use one or more antenna array pairs of the repeater node 610, one or more beam pairs of the repeater node 610, and/or the like that support full-duplex communication.

As shown by reference number 635, the control node 605 may transmit, to the repeater node 610, a configuration for a repeating operation (e.g., a repeating operation similar to those described above with respect to FIGS. 3 and 5, and/or the like). As described above, the configuration for the repeating operation may be based at least in part on the duplexing communication capability of the repeater node 610.

As shown by reference number 640, the repeater node 610 may perform the repeating operation indicated by the configuration received from the control node 605. The repeater node 610 may perform the repeating operation with one or more wireless nodes 615, with the control node 605, and/or the like. For example, the repeater node 610 may receive a signal from a first wireless node 615 in accordance with the configuration received from the control node 605. The repeater node 610 may process (e.g., digitally process and/or the like) the signal to regenerate the signal in accordance with the configuration received from the control node 605. The repeater node 610 may transmit the regenerated signal to a second wireless node 615 in accordance with the configuration received from the control node 605.

As a result, the control node 605 may be enabled to configure the repeater node 610 in accordance with the duplexing communication capability of the repeater node 610. Configuring the repeater node 610 in accordance with the duplexing communication capability of the repeater node 610 may improve network performance and reliability as the control node 605 may ensure that the repeater node 610 is capable of supporting the indicated repeating operations. Additionally, or alternatively, configuring the repeater node 610 in accordance with the duplexing communication capability of the repeater node 610 may improve network performance and reliability as the control node 605 may be enabled to configure higher performance repeating operations (e.g., using a full-duplex communication mode, a full-duplex forwarding communication mode, and/or the like) than would have otherwise been used had the repeater node 610 not indicated the duplexing communication capability of the repeater node 610.

As indicated above, FIG. 6 is provided as an example. Other examples may differ from what is described with respect to FIG. 6.

Figure 7:
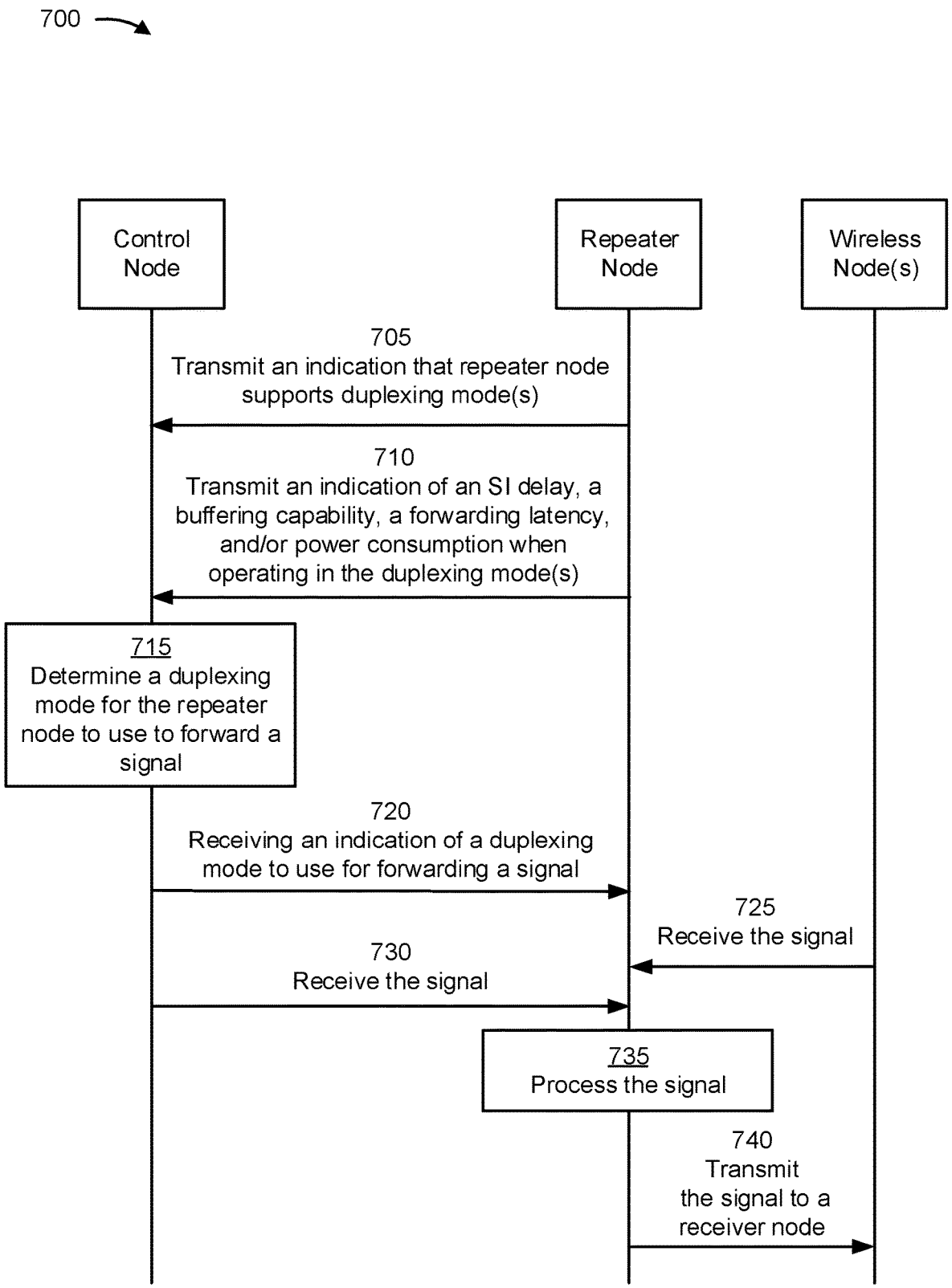
FIG. 7 is a diagram illustrating an example associated with techniques for determining a duplexing mode of operation of a repeater node, in accordance with the present disclosure.

FIG. 7 is a diagram illustrating an example 700 associated with techniques for determining a duplexing mode of operation of a repeater node, in accordance with the present disclosure. As shown in FIG. 7, a control node (e.g., a base station 110) may communicate with a repeater node (e.g., a base station 110), and/or one or more wireless nodes (e.g., a receiver node, a transmitter node, and/or the like). The control node, the one or more wireless nodes, and the receiver node may be part of a wireless network (e.g., wireless network 100). In some aspects, the control node may include the transmitter node, the receiver node, and/or the like.

As shown by reference number 705, the repeater node may transmit, and the control node may receive, an indication that the repeater node supports one or more duplexing modes (e.g., in a capability report). In some aspects, the repeater node may indicate that the repeater node supports one or more full duplexing modes, a full duplexing forwarding mode, a half-duplexing mode, and/or the like. For example, the repeater node may indicate that the repeater node supports one or more processing operations, such as one or more of the processing operations described with reference to FIG. 5.

As shown by reference number 710, the repeater node may transmit an indication of one or more location conditions (e.g., in a capability report), such as an SI delay, a buffering capability, a forwarding latency (e.g., as described in more detail in connection with FIG. 8), a power consumption, and/or the like when operating in the one or more duplexing modes. In some aspects, the repeater node may indicate the one or more local conditions for each of multiple supported duplexing modes.

In some aspects, the self-interference delay of the repeater node includes a sum of a clutter echo round trip time and a processing latency of an incoming signal. The clutter echo round trip time may define an amount of time that elapses between transmitting a signal and receiver the transmitted signal after being reflected by a remote object. The processing latency may be associated with an amount of time to process the incoming signal (e.g., an amount of time between receiving the incoming signal and an earliest start time for transmitting the incoming signal).

The self-interference delay may include a relative delay of a self-interference signal to an original signal. If the self-interference delay is relatively low (e.g. less than a size of a cyclic prefix), a looped back signal (from transmission of the self-interference signal to reception of the self-interference signal, reflected from remote clutter, and/or the like) may be within a cyclic prefix and may be considered to be part of an effective multi-path propagation environment. In other words, even if a power of the self-interference signal is relatively high, the self-interference signal may not have a significant negative impact on performance of forwarding by the repeater node. However, if the looped back signal has a relatively large self-interference delay with respect to the incoming signal (e.g., based at least in part on a large processing latency, a round trip time of the clutter echo, and/or the like), the self-interference signal may negatively impact performance of forwarding by the repeater node if self-interference is relatively high (e.g., there is not sufficient spatial isolation between a receive beam and a transmit beam).

In some aspects, the repeater node may indicate a total self-interference latency (e.g., a sum of clutter echo round trip time and processing latency) to the control node. In some aspects, another node (e.g., the receiver node, the control node, and/or the like) may measure the total latency. In some aspects, the repeater node may indicate only a portion of the total latency (e.g., a processing latency) and the control node may measure and/or receive an indication of another portion of the total self-interference latency (e.g., a clutter echo round trip time). In some aspects, the processing latency may be static or semi-static and the clutter echo round trip time may change dynamically with changes in an environment of the network. In some aspects, the self-interference latency may be associated with a pair of a receive beam and a transmit beam associated with the repeater node.

In some aspects, the buffering capability of the repeater node may indicate an amount of data that may be buffered (e.g., stored) at the repeater node at a time. Based at least in part on the repeater node having a limited buffering capability, the repeater node may be unable to store a large data set. In other words, the repeater node may not support reception of a large-size incoming signal, storage of the incoming signal, and a later transmission of the incoming signal. Based at least in part on the repeater node having a limited buffering capability, the control node may configure a size of incoming signals based at least in part on the buffering capability of the repeater node, configure the repeater node to perform full duplex forwarding, and/or the like.

In some aspects, the repeater node may indicate a forwarding latency of the repeater node based at least in part on operating in the one or more duplexing modes. For example, a full duplexing mode may have a lower latency than a half duplexing mode based at least in part on avoiding delays associated with waiting to transmit a signal until reception is compete and/or waiting to receive a signal until transmission is complete. In some aspects, operation within the full duplexing mode may consume more power than operation within the half-duplexing mode when actively transmitting and/or receiving. However, operation within the full-duplexing mode may allow the repeater node to have inactive times, which may reduce consumption of power over time. The repeater node may indicate power consumption for transmitting and/or receiving a number of communications over a period of time for a full-duplex mode and for a half-duplex mode, a difference between power consumption for the full-duplex mode and for the half-duplex mode, an indication of a duplexing mode that has a higher power consumption efficiency, and/or the like.

As shown by reference number 715, the control node may determine a duplexing mode for the repeater node to use to forward a signal. In some aspects, the control node may determine the duplexing mode based at least in part on the self-interference delay (e.g., a total self-interference delay or a component of the self-interference delay), a buffering capability, a forwarding latency, a power consumption, a required quality of service for the signal, and/or the like for the repeater node when operating in the one or more duplexing modes. In some aspects, the control node may determine the duplexing mode based at least in part on support of the one or more duplexing modes by the repeater node, self-interference of the repeater node, a quality of service required for the signal, and/or the like.

In some aspects, the control node may determine timing for configuring and/or scheduling the repeater node, scheduling of a receiver node, and/or a transmitter node, and/or the like based at least in part on the duplexing mode report. In some aspects, the indication may be semi-static (e.g., configured with RRC signaling, one or more MAC control elements (MAC CEs), and/or the like), dynamic (e.g., configured with downlink control information, one or more MAC CEs, and/or the like), and/or the like.

As shown by reference number 720, the repeater node may receive an indication of a duplexing mode to use for forwarding a signal. In some aspects, the repeater node may configure the repeater node based at least in part on the indication. In some aspects, the indication may indicate a schedule for the repeater node to receive and transmit the signal.

As shown by reference number 725, the repeater node may receive the signal from at least one of the one or more wireless nodes. For example, the repeater node may receive the signal from a transmitter node of the one or more wireless nodes. As shown by reference number 730, the repeater node may receive the signal from the control node.

As shown by reference number 735, the repeater node may process the signal. For example, the repeater node may process the signal based at least in part on the one or more processing modes. In some aspects, the repeater node may select a set of the one or more processing operations based at least in part on an indication from the control node, one or more parameters of the signal, and/or the like.

As shown by reference number 740, the repeater node may transmit the signal to the receiver node. In some aspects, the repeater node may transmit the signal to the receiver node based at least in part on the indication of the duplexing mode to use for forwarding the signal.

Based at least in part on the repeater node transmitting the duplexing mode report, the control node may determine a duplexing mode for the repeater node, timing for transmitting a signal to be forwarded, a schedule for a receiving node to receive the signal from the repeater node, and/or the like. In this way, the control node may avoid or reduce communication errors, which may conserve network, computer, and communication resources that may otherwise have been used to detect and/or correct.

As indicated above, FIG. 7 is provided as an example. Other examples may differ from what is described with respect to FIG. 7.

Figure 8:
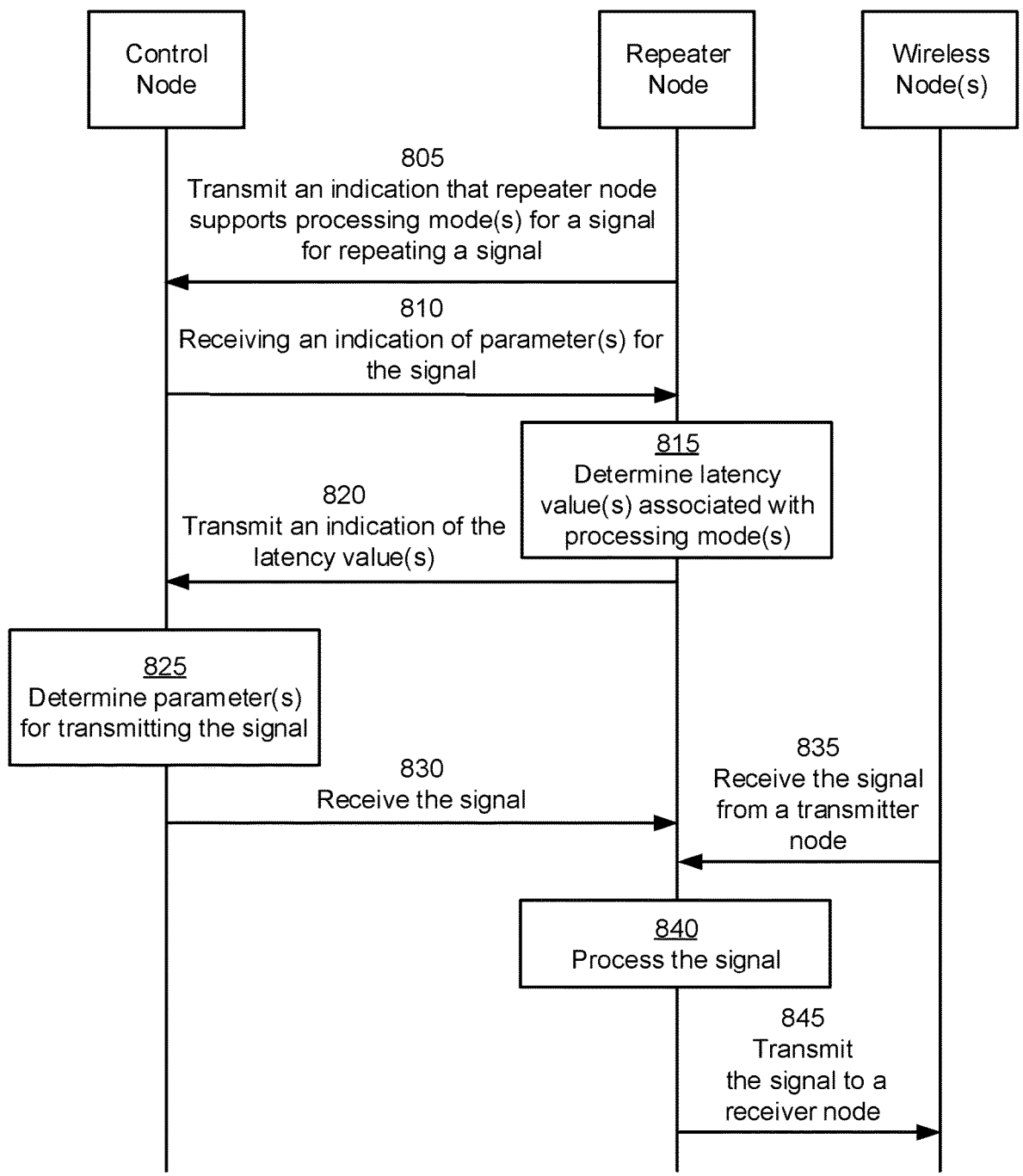
FIG. 8 is a diagram illustrating an example associated with techniques for reporting processing latency of a repeater node, in accordance with the present disclosure.

FIG. 8 is a diagram illustrating an example 800 associated with techniques for reporting processing latency of a repeater node, in accordance with the present disclosure. As shown in FIG. 8, a control node (e.g., a base station 110) may communicate with a repeater node (e.g., a base station 110), and/or one or more wireless nodes (e.g., a receiver node, a transmitter node, and/or the like). The control node, the one or more wireless nodes, and the receiver node may be part of a wireless network (e.g., wireless network 100). In some aspects, the control node may include the transmitter node, the receiver node, and/or the like.

As shown by reference number 805, the repeater node may transmit an indication that the repeater node supports one or more processing modes for repeating a signal (e.g., in a capability report). For example, the repeater node may indicate that the repeater node supports one or more of the processing operations described with reference to FIG. 5. In some aspects, the one or more processing modes may include multiple digital processing modes.

As shown by reference number 810, the repeater node may receive an indication of one or more parameters for the signal. In some aspects, the one or more parameters may include a signal type of the signal, an MCS of the signal, a number of symbols of the signal, occupied bandwidth, and/or the like.

As shown by reference number 815, the repeater node may determine one or more latency values associated with one or more processing modes for processing the signal. In some aspects, the repeater node may determine the one or more latency values based at least in part on the one or more parameters for the signal. For example, processing a reference signal may be associated with a lower latency than processing a physical channel signal (e.g., a control channel signal, a data channel signal, and/or the like).

In some aspects, the latency values may be based at least in part on an expected first time (e.g., a time at a start of reception of the signal, a time at a completion of reception of the signal, a time at a reception of a command to repeat the signal) and an expected second time (e.g., a time at a start of transmission of a regeneration of the signal, a time at a start of reception and/or processing of the signal, and/or the like).

In some aspects, a latency value may be based at least in part on an amount of time from starting to receive the signal to starting to transmit the signal (e.g., a regeneration of the signal after digital processing). In some aspects, a latency value may be based at least in part on an amount of time from completion of receiving the signal to starting to transmit the signal (e.g., if processing includes determining a codeword associated with the signal, decoding and/or descrambling the signal, and/or the like). In some aspects, a latency value may be based at least in part on an amount of time from receiving a command to repeat the signal to starting to receive and process the signal. In some aspects, a latency value may be based at least in part on an amount of time from receiving a command to repeat the signal to finishing regeneration of the signal (e.g., from stored data associated with the signal) and starting to transmit the signal.

As shown by reference number 820, the repeater node may transmit, to the control node, an indication of the one or more latency values (e.g., in a capability report). For example, the repeater node may report the one or more latency values associated with the one or more processing modes for repeating the signal. In some aspects, the repeater node may report the one or more latency values based at least in part on receiving a request from the control node, performing a configuration process to configure the repeater node, receiving the indication of the one or more parameters for the signal, and/or the like.

In some aspects, the control node may determine one or more parameters for transmitting the signal. In some aspects, the one or more parameters may include a timing parameter (e.g., a schedule transmitting the signal to the repeater node), a signal type (e.g., a MAC layer communication, an RLC layer communication, a physical layer communication, and/or the like), a number of symbols to use for the signal, and/or the like. For example, the control node may determine to transmit the signal to the repeater node at a time, based at least in part on the one or more latency values, to facilitate transmission of the signal by the repeater node according to a scheduled reception of the signal by a receiver node. In some aspects, the control node may determine to communicate with a receiver node, via the repeater node, using relatively short slots or relatively long slots based at least in part on the one or more latency values (e.g., using relatively short slots if latency is relatively high).

In some aspects, as shown by reference number 825, the control node may determine one or more parameters (e.g., as discussed above) for a transmitter node of the one or more wireless nodes to use to transmitting the signal. In some aspects, the control node may transmit an indication of the one or more parameters to the transmitter node.

As shown by reference number 830, the repeater node may receive the signal from the control node. As shown by reference number 835, the repeater node may receive the signal from at least one of the one or more wireless nodes. For example, the repeater node may receive the signal from a transmitter node of the one or more wireless nodes.

As shown by reference number 840, the repeater node may process the signal. For example, the repeater node may process the signal based at least in part on the one or more processing modes. In some aspects, the repeater node may select a set of the one or more processing operations based at least in part on an indication from the control node, one or more parameters of the signal, and/or the like.

As shown by reference number 845, the repeater node may transmit the signal to the receiver node. In some aspects, the repeater node may transmit the signal to the receiver node with a delay (e.g., latency) that is based at least in part on an indication of a latency value of the one or more latency values, the one or more parameters of the signal, and/or the like.

Based at least in part on the repeater node transmitting the indication of one or more latency values, the control node may determine the one or more parameters for transmitting the signal. In this way, the control node may avoid or reduce communication errors that are based at least in part on latency of the repeater node, which may conserve network, computer, and communication resources that may otherwise have been used to detect and/or correct.

As indicated above, FIG. 8 is provided as an example. Other examples may differ from what is described with respect to FIG. 8.

Figure 9:
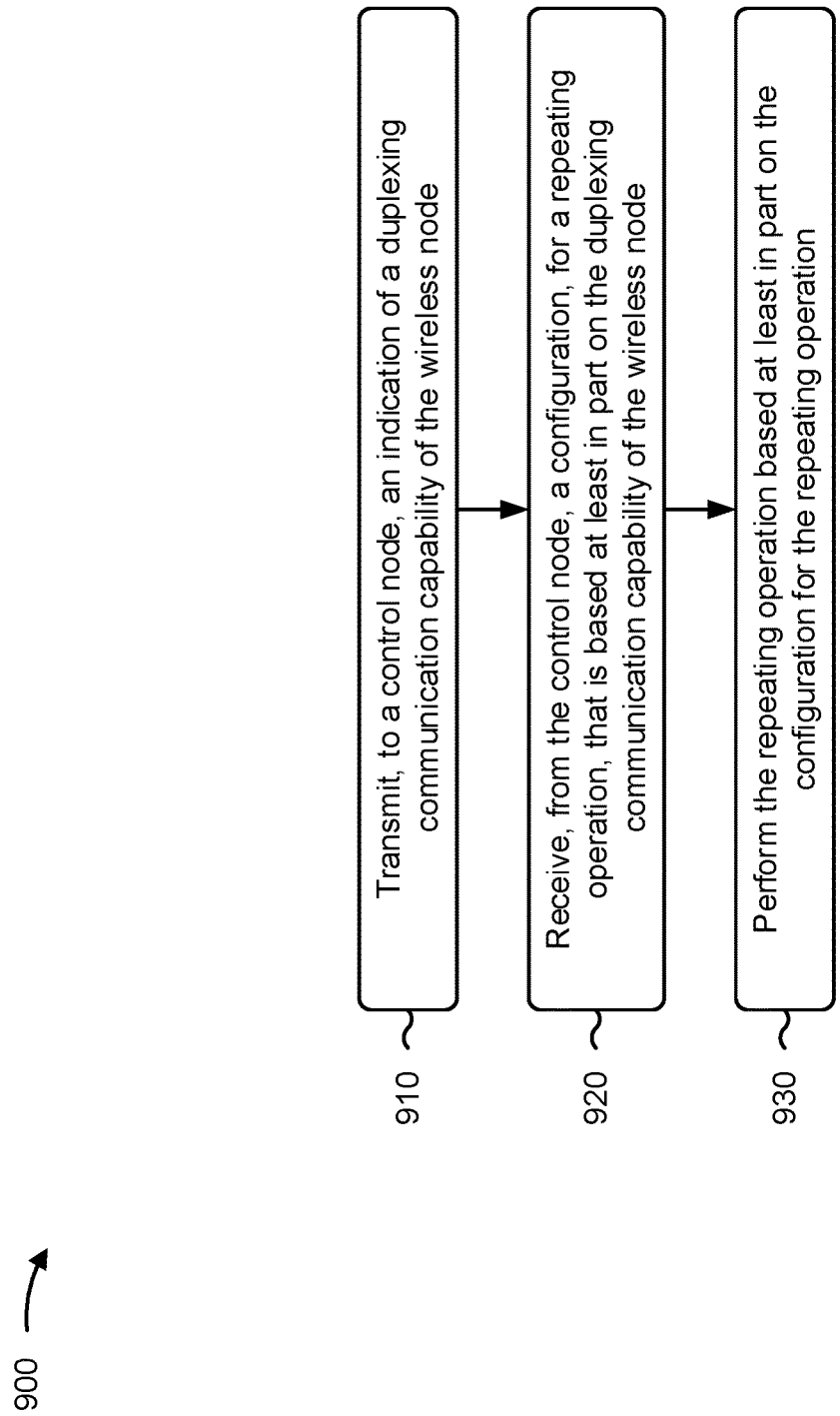
FIGS. 9-14 are diagrams illustrating example processes associated with reporting a repeater communication capability, in accordance with the present disclosure.

FIG. 9 is a diagram illustrating an example process 900 performed, for example, by a wireless node, in accordance with the present disclosure. Example process 900 is an example where the wireless node (e.g., a repeater node, the repeater node 610, a base station 110, a UE 120, and/or the like) performs operations associated with reporting repeater duplexing communication capability.

As shown in FIG. 9, in some aspects, process 900 may include transmitting, to a control node, an indication of a duplexing communication capability of the wireless node (block 910). For example, the wireless node (e.g., using transmission component 1504, depicted in FIG. 15) may transmit, to a control node, an indication of a duplexing communication capability of the wireless node, as described above.

As further shown in FIG. 9, in some aspects, process 900 may include receiving, from the control node, a configuration, for a repeating operation, that is based at least in part on the duplexing communication capability of the wireless node (block 920). For example, the wireless node (e.g., using reception component 1502, depicted in FIG. 15) may receive, from the control node, a configuration, for a repeating operation, that is based at least in part on the duplexing communication capability of the wireless node, as described above.

As further shown in FIG. 9, in some aspects, process 900 may include performing the repeating operation based at least in part on the configuration for the repeating operation (block 930). For example, the wireless node (e.g., using performing component 1508, depicted in FIG. 15) may perform the repeating operation based at least in part on the configuration for the repeating operation, as described above.

Process 900 may include additional aspects, such as any single aspect or any combination of aspects described below and/or in connection with one or more other processes described elsewhere herein.

In a first aspect, process 900 includes determining the duplexing communication capability of the wireless node based at least in part on at least one of a stored configuration, an antenna array configuration associated with the wireless node, or a digital processing configuration. For example, the wireless node (e.g., using determination component 1510, depicted in FIG. 15) may determine the duplexing communication capability of the wireless node based at least in part on at least one of a stored configuration, an antenna array configuration associated with the wireless node, or a digital processing configuration.

In a second aspect, alone or in combination with the first aspect, the duplexing communication capability of the wireless node is at least one of a half-duplex communication capability, a full-duplex communication capability, a conditional full-duplex communication capability, or a full-duplex forwarding communication capability.

In a third aspect, alone or in combination with one or more of the first and second aspects, process 900 includes determining an active antenna array configuration associated with the wireless node, and determining the duplexing communication capability of the wireless node based at least in part on the active antenna array configuration. For example, the wireless node (e.g., using determination component 1510, depicted in FIG. 15) may determine an active antenna array configuration associated with the wireless node, and determine the duplexing communication capability of the wireless node based at least in part on the active antenna array configuration, In a fourth aspect, alone or in combination with one or more of the first through third aspects, determining the duplexing communication capability of the wireless node based at least in part on the active antenna array configuration comprises determining that the wireless node supports a half-duplex communication capability when using a same antenna array for receiving communications and transmitting communications. For example, the wireless node (e.g., using determination component 1510, depicted in FIG. 15) may determine that the wireless node supports a half-duplex communication capability when using a same antenna array for receiving communications and transmitting communications.

In a fifth aspect, alone or in combination with one or more of the first through fourth aspects, determining the duplexing communication capability of the wireless node based at least in part on the active antenna array configuration comprises determining that the wireless node supports a full-duplex communication capability for one or more pairs of antenna arrays. For example, the wireless node (e.g., using determination component 1510, depicted in FIG. 15) may determine that the wireless node supports a full-duplex communication capability for one or more pairs of antenna arrays.

In a sixth aspect, alone or in combination with one or more of the first through fifth aspects, transmitting the indication of a duplexing communication capability of the wireless node comprises transmitting, to the control node, an indication that the wireless node supports a conditional full-duplex communication capability associated with at least one of one or more antenna array pairs, or one or more beam pairs. For example, the wireless node (e.g., using transmission component 1504, depicted in FIG. 15) may transmit, to the control node, an indication that the wireless node supports a conditional full-duplex communication capability associated with at least one of one or more antenna array pairs, or one or more beam pairs.

In a seventh aspect, alone or in combination with one or more of the first through sixth aspects, process 900 includes determining that the wireless node is capable of receiving a signal during a first time period and forwarding the signal, in accordance with a digital repeating operation, during a second time period that overlaps with the first time, and determining that the duplexing communication capability includes a full-duplex forwarding communication capability based at least in part on the determination that the wireless node is capable of receiving the signal during the first time period and forwarding the signal, in accordance with the digital repeating operation, during the second time period that overlaps with the first time. For example, the wireless node (e.g., using determination component 1510, depicted in FIG. 15) may determine that the wireless node is capable of receiving a signal during a first time period and forwarding the signal, in accordance with a digital repeating operation, during a second time period that overlaps with the first time and determine that the duplexing communication capability includes a full-duplex forwarding communication capability based at least in part on the determination that the wireless node is capable of receiving the signal during the first time period and forwarding the signal, in accordance with the digital repeating operation, during the second time period that overlaps with the first time.

In an eighth aspect, alone or in combination with one or more of the first through seventh aspects, the digital repeating operation comprises receiving, from a first wireless node, the signal, digitally processing the signal, regenerating the signal to form a regenerated signal based at least in part on digitally processing the signal, and transmitting, to a second wireless node, the regenerated signal.

In a ninth aspect, alone or in combination with one or more of the first through eighth aspects, transmitting the indication of the duplexing communication capability of the wireless node comprises transmitting, during an initial capability exchange with the control node, the indication of the duplexing communication capability of the wireless node. For example, the wireless node (e.g., using transmission component 1504, depicted in FIG. 15) may transmit, during an initial capability exchange with the control node, the indication of the duplexing communication capability of the wireless node.

In a tenth aspect, alone or in combination with one or more of the first through ninth aspects, transmitting the indication of the duplexing communication capability of the wireless node comprises receiving, from the control node, a request to provide the indication of the duplexing communication capability, and transmitting, to the control node, the indication of the duplexing communication capability of the wireless node based at least in part on the reception of the request to provide the indication of the duplexing communication capability. For example, the wireless node (e.g., using reception component 1502, depicted in FIG. 15) may receive, from the control node, a request to provide the indication of the duplexing communication capability, and the wireless node (e.g., using transmission component 1504, depicted in FIG. 15) may transmit, to the control node, the indication of the duplexing communication capability of the wireless node based at least in part on the reception of the request to provide the indication of the duplexing communication capability.

In an eleventh aspect, alone or in combination with one or more of the first through tenth aspects, transmitting the indication of the duplexing communication capability of the wireless node comprises receiving, from the control node, a configuration for a repeating operation indicating a duplex operating mode for the wireless node, determining that the wireless node is not capable of supporting the duplex operating mode, and transmitting, to the control node, an indication that the wireless node is not capable of supporting the duplex operating mode. For example, the wireless node (e.g., using reception component 1502, depicted in FIG. 15) may receive, from the control node, a configuration for a repeating operation indicating a duplex operating mode for the wireless node, the wireless node (e.g., using determination component 1510, depicted in FIG. 15) may determine that the wireless node is not capable of supporting the duplex operating mode, and the wireless node (e.g., using transmission component 1504, depicted in FIG. 15) may transmit, to the control node, an indication that the wireless node is not capable of supporting the duplex operating mode.

In a twelfth aspect, alone or in combination with one or more of the first through eleventh aspects, the wireless node is at least one of an analog repeater device, or a digital repeater device.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
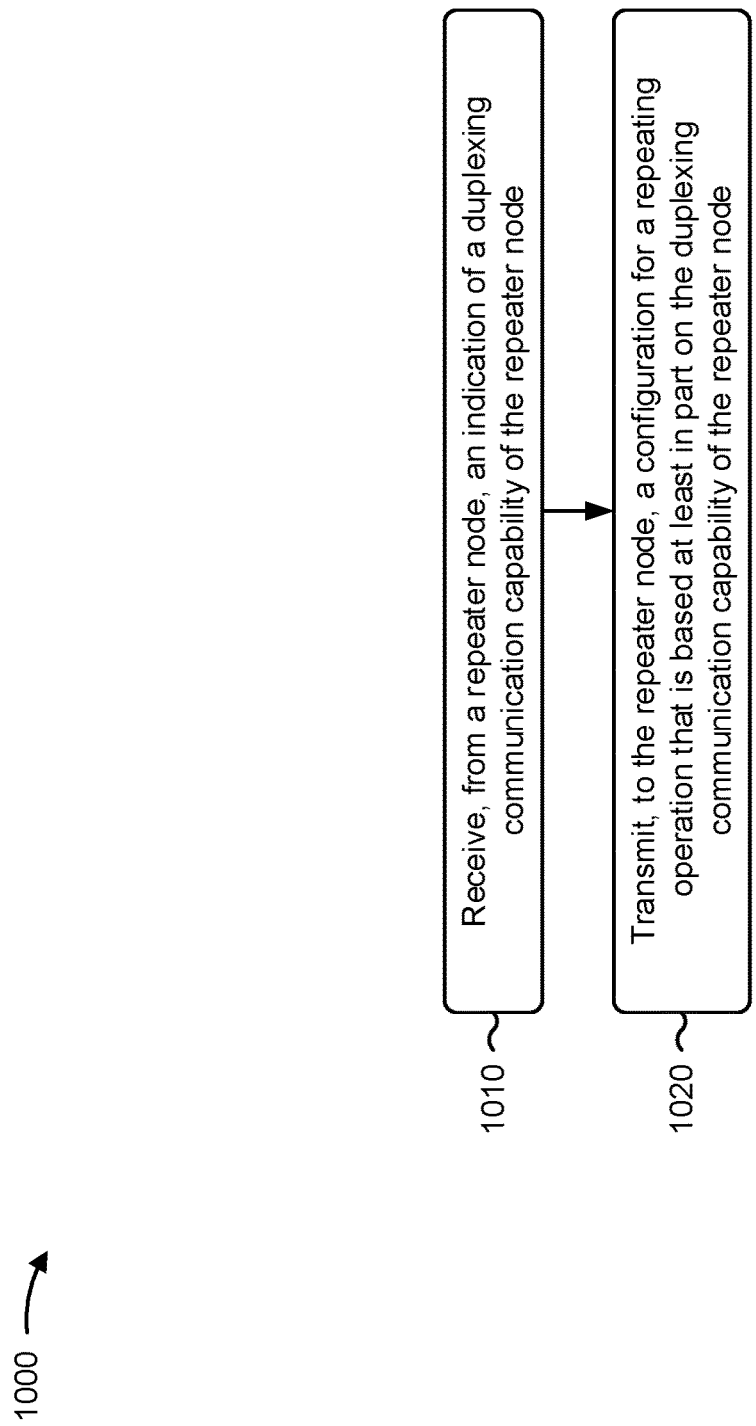

FIG. 10 is a diagram illustrating an example process 1000 performed, for example, by a control node, in accordance with the present disclosure. Example process 1000 is an example where the control node (e.g., control node 605, a base station 110, a DU of an IAB node, and/or the like) performs operations associated with reporting repeater duplexing communication capability.

As shown in FIG. 10, in some aspects, process 1000 may include receiving, from a repeater node, an indication of a duplexing communication capability of the repeater node (block 1010). For example, the control node (e.g., using reception component 1602, depicted in FIG. 16) may receive, from a repeater node, an indication of a duplexing communication capability of the repeater node, as described above.

As further shown in FIG. 10, in some aspects, process 1000 may include transmitting, to the repeater node, a configuration for a repeating operation that is based at least in part on the duplexing communication capability of the repeater node (block 1020). For example, the control node (e.g., using transmission component 1604, depicted in FIG. 16) may transmit, to the repeater node, a configuration for a repeating operation that is based at least in part on the duplexing communication capability of the repeater node, as described above.

Process 1000 may include additional aspects, such as any single aspect or any combination of aspects described below and/or in connection with one or more other processes described elsewhere herein.

In a first aspect, the duplexing communication capability of the repeater node is at least one of a half-duplex communication capability, a full-duplex communication capability, a conditional full-duplex communication capability, or a full-duplex forwarding communication capability.

In a second aspect, alone or in combination with the first aspect, receiving the indication of the duplexing communication capability of the repeater node comprises receiving, from the repeater node, an indication that the repeater node supports a conditional full-duplex communication capability associated with one or more antenna array pairs of the repeater node, or one or more beam pairs at the repeater node. For example, the control node (e.g., using reception component 1602, depicted in FIG. 16) may receive, from the repeater node, an indication that the repeater node supports a conditional full-duplex communication capability associated with one or more antenna array pairs of the repeater node, or one or more beam pairs at the repeater node.

In a third aspect, alone or in combination with one or more of the first and second aspects, receiving the indication of the duplexing communication capability of the repeater node comprises receiving, during an initial capability exchange with the repeater node, the indication of the duplexing communication capability of the repeater node. For example, the control node (e.g., using reception component 1602, depicted in FIG. 16) may receive, during an initial capability exchange with the repeater node, the indication of the duplexing communication capability of the repeater node.

In a fourth aspect, alone or in combination with one or more of the first through third aspects, receiving the indication of the duplexing communication capability of the repeater node comprises transmitting, to the repeater node, a request to provide the duplexing communication capability, and receiving, from the repeater node, the indication of the duplexing communication capability of the repeater node based at least in part on the transmission of the request to provide the duplexing communication capability. For example, the control node (e.g., using transmission component 1604, depicted in FIG. 16) may transmit, to the repeater node, a request to provide the duplexing communication capability, and the control node (e.g., using reception component 1602, depicted in FIG. 16) may receive, from the repeater node, the indication of the duplexing communication capability of the repeater node based at least in part on the transmission of the request to provide the duplexing communication capability.

In a fifth aspect, alone or in combination with one or more of the first through fourth aspects, receiving the indication of the duplexing communication capability of the repeater node comprises transmitting, to the repeater node, a configuration for a repeating operation indicating a duplex operating mode for the repeater node, and receiving, from the repeater node, an indication that the repeater node is not capable of supporting the duplex operating mode. For example, the control node (e.g., using transmission component 1604, depicted in FIG. 16) may transmit, to the repeater node, a configuration for a repeating operation indicating a duplex operating mode for the repeater node, and the control node (e.g., using reception component 1602, depicted in FIG. 16) may receive, from the repeater node, an indication that the repeater node is not capable of supporting the duplex operating mode.

In a sixth aspect, alone or in combination with one or more of the first through fifth aspects, the repeater node is at least one of an analog repeater device, or a digital repeater device.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
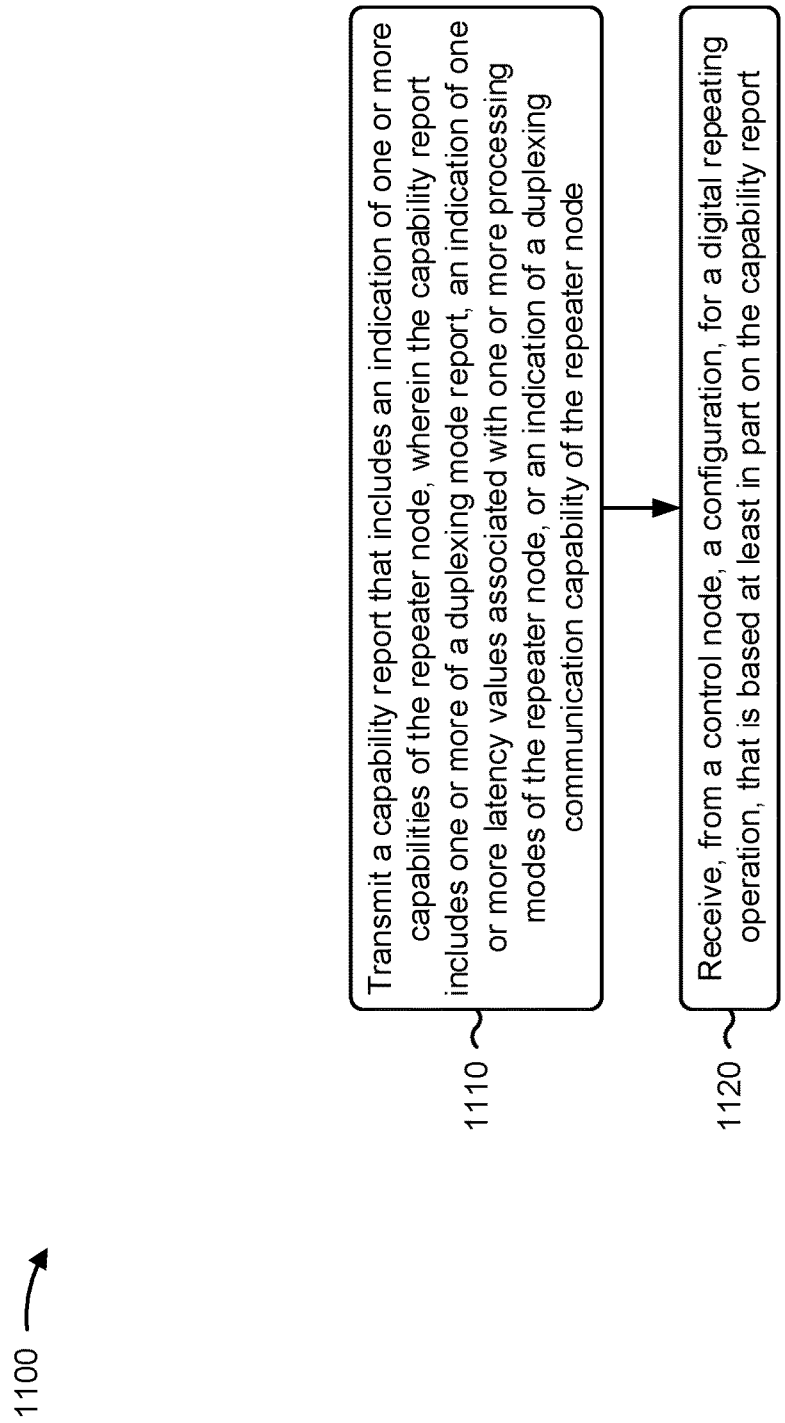

FIG. 11 is a diagram illustrating an example process 1100 performed, for example, by a repeater node, in accordance with the present disclosure. Example process 1100 is an example where the repeater node (e.g., a base station 110, apparatus 1700 (described below with respect to FIG. 17), and/or the like) performs operations associated with techniques for determining a duplexing mode of operation of a repeater node.

As shown in FIG. 11, in some aspects, process 1100 may include transmitting a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node (block 1110). For example, the repeater node (e.g., using transmission component 1704 of apparatus 1700, depicted in FIG. 17) may transmit a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node, as described above.

As further shown in FIG. 11, in some aspects, process 1100 may include receiving, from a control node, a configuration, for a digital repeating operation, that is based at least in part on the capability report (block 1120). For example, the repeater node (e.g., using reception component 1702 of apparatus 1700, depicted in FIG. 17) may receive, from a control node, a configuration, for a digital repeating operation, that is based at least in part on the capability report, as described above.

Process 1100 may include additional aspects, such as any single aspect or any combination of aspects described below and/or in connection with one or more other processes described elsewhere herein.

In a first aspect, process 1100 includes performing the digital repeating operation based at least in part on the configuration for the repeating operation.

In a second aspect, alone or in combination with the first aspect, performing the digital repeating operation includes receiving, from a first wireless node, a signal; digitally processing the signal; regenerating the signal to form a regenerated signal based at least in part on digitally processing the signal; and transmitting, to a second wireless node, the regenerated signal.

In a third aspect, alone or in combination with one or more of the first and second aspects, the duplexing mode report includes an indication of the one or more duplexing modes supported by the repeater node, and wherein the duplexing mode report includes one or more of an indication of a self-interference delay, an indication of a buffering capability, an indication of a forwarding latency, or an indication of a power consumption of the repeater node when operating in the one or more duplexing modes.

In a fourth aspect, alone or in combination with one or more of the first through third aspects, the self-interference delay of the repeater node includes a sum of a clutter echo round trip time and a processing latency of an incoming signal.

In a fifth aspect, alone or in combination with one or more of the first through fourth aspects, the self-interference delay of the repeater node is based at least in part on a first beam configured for transmission by the repeater node and a second beam configured for reception by the repeater node.

In a sixth aspect, alone or in combination with one or more of the first through fifth aspects, the buffering capability of the repeater node is based at least in part on an amount of data that the repeater node can store.

In a seventh aspect, alone or in combination with one or more of the first through sixth aspects, the power consumption of the repeater node is based at least in part on an amount of power consumed when operating in the one or more duplexing modes.

In an eighth aspect, alone or in combination with one or more of the first through seventh aspects, the one or more duplexing modes include one or more of a full duplexing mode, a full duplex forwarding mode, or a half duplexing mode.

In a ninth aspect, alone or in combination with one or more of the first through eighth aspects, transmitting the capability report includes receiving, from the control node, an initial configuration for the digital repeating operation; and transmitting, to the control node, the capability report based at least in part on the repeater node being unable to support the initial configuration.

In a tenth aspect, alone or in combination with one or more of the first through ninth aspects, transmitting the capability report includes transmitting, during an initial capability exchange with the control node, the capability report.

In an eleventh aspect, alone or in combination with one or more of the first through tenth aspects, transmitting the capability report includes transmitting, to the control node, an indication that the repeater node supports a conditional full-duplex communication capability associated with at least one of: one or more antenna array pairs, or one or more beam pairs.

In a twelfth aspect, alone or in combination with one or more of the first through eleventh aspects, the duplexing communication capability of the repeater node is at least one of: a half-duplex communication capability, a full-duplex communication capability, a conditional full-duplex communication capability, or a full-duplex forwarding communication capability.

In a thirteenth aspect, alone or in combination with one or more of the first through twelfth aspects, the one or more latency values associated with the one or more processing modes, for repeating a signal, are based at least in part on one or more of a signal type of the signal, a modulation and coding scheme of the signal, a number of symbols of the signal, or an occupied bandwidth of the signal.

In a fourteenth aspect, alone or in combination with one or more of the first through thirteenth aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
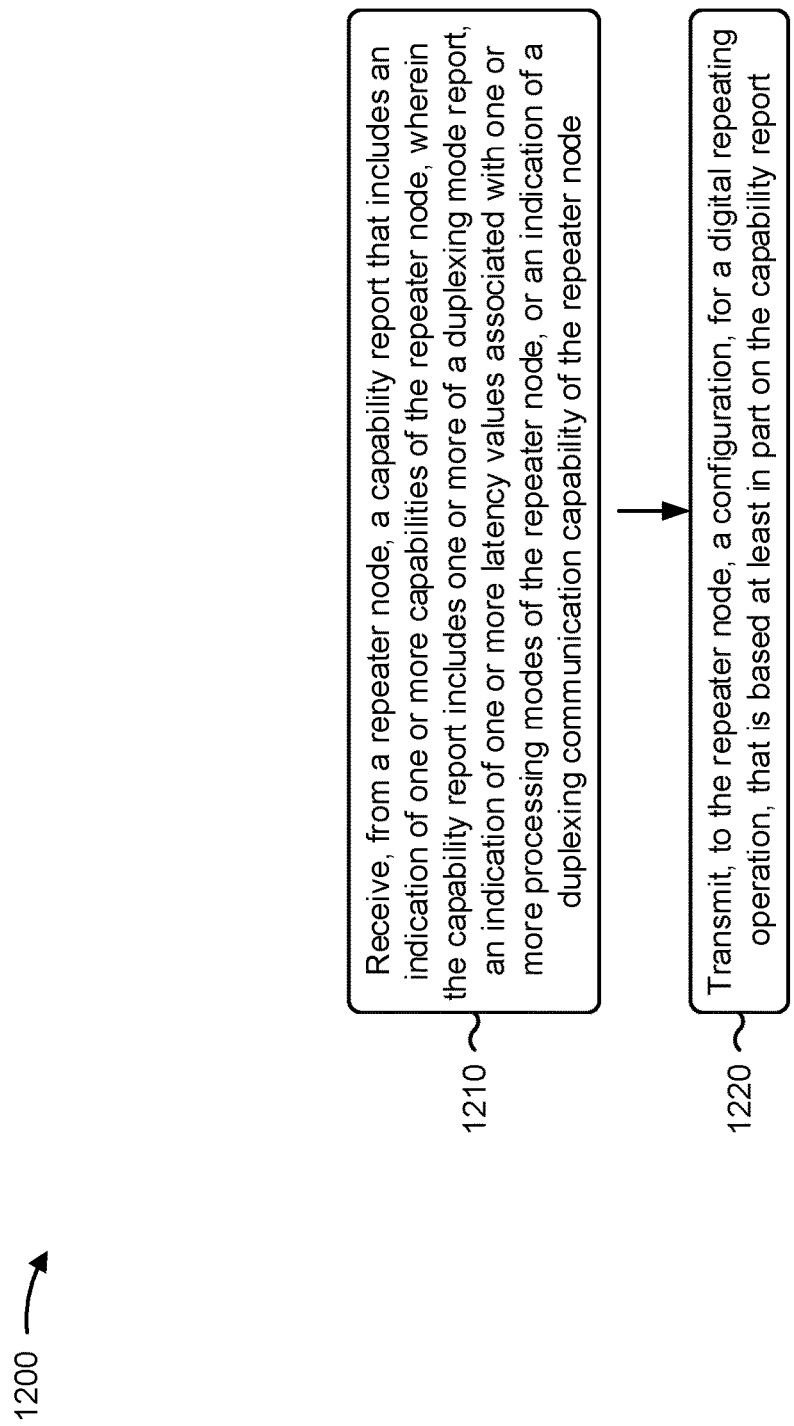

FIG. 12 is a diagram illustrating an example process 1200 performed, for example, by a control node, in accordance with the present disclosure. Example process 1200 is an example where the control node (e.g., a base station 110, apparatus 1800 (described below with respect to FIG. 18), and/or the like) performs operations associated with techniques for determining a duplexing mode of operation of a repeater node.

As shown in FIG. 12, in some aspects, process 1200 may include receiving, from a repeater node, a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node (block 1210). For example, the control node (e.g., using reception component 1802 of apparatus 1800) may receive, from a repeater node, a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node, as described above.

As further shown in FIG. 12, in some aspects, process 1200 may include transmitting, to the repeater node, a configuration, for a digital repeating operation, that is based at least in part on the capability report (block 1220). For example, the control node (e.g., using transmission component 1804 of apparatus 1800) may transmit, to the repeater node, a configuration, for a digital repeating operation, that is based at least in part on the capability report, as described above.

Process 1200 may include additional aspects, such as any single aspect or any combination of aspects described below and/or in connection with one or more other processes described elsewhere herein.

In a first aspect, process 1200 includes determining the configuration based at least in part on the capability report.

In a second aspect, alone or in combination with the first aspect, the duplexing mode report includes an indication of the one or more duplexing modes supported by the repeater node, and the duplexing mode report includes one or more of an indication of a self-interference delay, an indication of a buffering capability, an indication of a forwarding latency, or an indication of a power consumption of the repeater node when operating in the one or more duplexing modes.

In a third aspect, alone or in combination with one or more of the first and second aspects, the self-interference delay of the repeater node includes a sum of a clutter echo round trip time and a processing latency of an incoming signal for the repeater node.

In a fourth aspect, alone or in combination with one or more of the first and third aspects, the self-interference delay of the repeater node is based at least in part on a first beam configured for transmission by the repeater node and a second beam configured for reception by the repeater node.

In a fifth aspect, alone or in combination with one or more of the first and fourth aspects, the buffering capability of the repeater node is based at least in part on an amount of data that the repeater node can store after receiving the signal and forwarding the signal.

In a sixth aspect, alone or in combination with one or more of the first and fifth aspects, the power consumption of the repeater node is based at least in part on an amount of power consumed when operating in the one or more duplexing modes.

In a seventh aspect, alone or in combination with one or more of the first through sixth aspects, the one or more duplexing modes comprise one or more of a full duplexing mode, a full duplex forwarding mode, or a half duplexing mode.

In an eighth aspect, alone or in combination with one or more of the first through seventh aspects, process 1200 includes determining the duplexing mode for the repeater node to use for forwarding the signal based at least in part on one or more of the indication of the self-interference delay, the indication of the buffering capability, the indication of the forwarding latency, the indication of the power consumption, or a quality of service requirement of the signal.

In a ninth aspect, alone or in combination with one or more of the first through eighth aspects, receiving the capability report includes transmitting, to the repeater node, an initial configuration for the digital repeating operation; and receiving, from the repeater node, the capability report based at least in part on the repeater node being unable to support the initial configuration.

In a tenth aspect, alone or in combination with one or more of the first through ninth aspects, receiving the capability report includes receiving, during an initial capability exchange with the repeater node, the capability report.

In an eleventh aspect, alone or in combination with one or more of the first through tenth aspects, receiving the capability report includes receiving, from the repeater node, an indication that the repeater node supports a conditional full-duplex communication capability associated with at least one of: one or more antenna array pairs, or one or more beam pairs.

In a twelfth aspect, alone or in combination with one or more of the first through eleventh aspects, the duplexing communication capability of the repeater node is at least one of: a half-duplex communication capability, a full-duplex communication capability, a conditional full-duplex communication capability, or a full-duplex forwarding communication capability.

In a thirteenth aspect, alone or in combination with one or more of the first through twelfth aspects, the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

In a fourteenth aspect, alone or in combination with one or more of the first through thirteenth aspects, the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
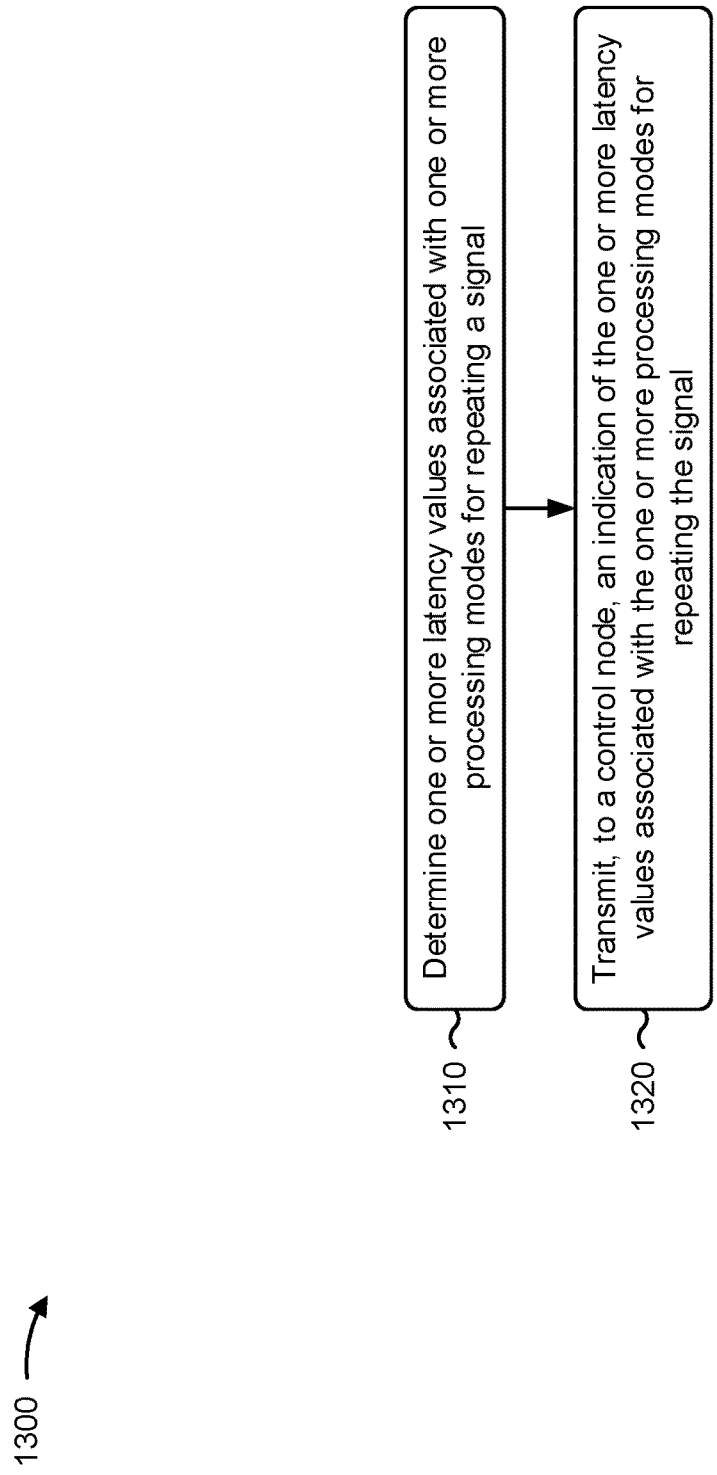

FIG. 13 is a diagram illustrating an example process 1300 performed, for example, by a repeater node, in accordance with the present disclosure. Example process 1300 is an example where the repeater node (e.g., a base station 110, apparatus 1900 (depicted in FIG. 19), and/or the like) performs operations associated with techniques for reporting processing latency of a repeater node.

As shown in FIG. 13, in some aspects, process 1300 may include determining one or more latency values associated with one or more processing modes for repeating a signal (block 1310). For example, the repeater node (e.g., using determination component 1908, depicted in FIG. 19) may determine one or more latency values associated with one or more processing modes for repeating a signal, as described above.

As further shown in FIG. 13, in some aspects, process 1300 may include transmitting, to a control node, an indication of the one or more latency values associated with the one or more processing modes for repeating the signal (block 1320). For example, the repeater node (e.g., using transmission component 1904, depicted in FIG. 19) may transmit, to a control node, an indication of the one or more latency values associated with the one or more processing modes for repeating the signal, as described above.

Process 1300 may include additional aspects, such as any single aspect or any combination of aspects described below and/or in connection with one or more other processes described elsewhere herein.

In a first aspect, the one or more processing modes for repeating the signal include multiple digital processing modes.

In a second aspect, alone or in combination with the first aspect, process 1300 includes transmitting, to the control node, an indication that the repeater node supports the one or more processing modes for repeating the signal.

In a third aspect, alone or in combination with one or more of the first and second aspects, the determination of the one or more latency values associated with the one or more processing modes for repeating the signal includes determining the one or more latency values associated with the one or more processing modes for repeating the signal based at least in part on one or more of a signal type of the signal, an MCS of the signal, or a number of symbols of the signal.

In a fourth aspect, alone or in combination with one or more of the first through third aspects, the one or more latency values include one or more indications of: a time expected to elapse between a start of reception of the signal and a start of transmission of a regeneration of the signal, a time expected to elapse between a completion of reception of the signal and a start of transmission of the regeneration of the signal, a time expected to elapse between reception of a command to repeat the signal to a start of reception of the signal, or a time expected to elapse between reception of the command to repeat the signal and a start of transmission of the regeneration of the signal.

In a fifth aspect, alone or in combination with one or more of the first through third aspects, the method further includes receiving a configuration for forwarding a signal to a receiving device or the control node, wherein the configuration is based at least in part on the one or more latency values In a sixth aspect, alone or in combination with one or more of the first through third aspects, forwarding the signal comprises one or more of: transmitting the signal via beamforming, or transmitting the signal in a millimeter wave band.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
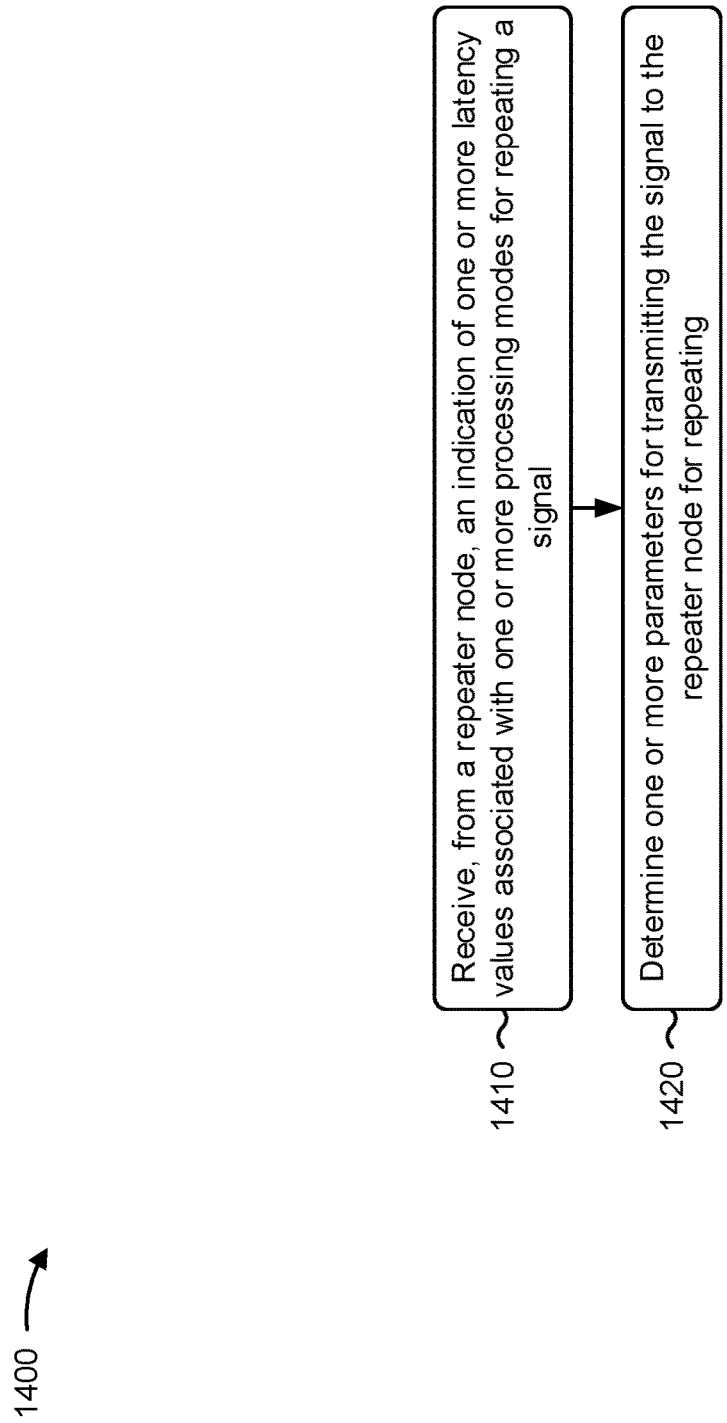

FIG. 14 is a diagram illustrating an example process 1400 performed, for example, by a control node, in accordance with the present disclosure. Example process 1400 is an example where the control node (e.g., a base station 110, apparatus 2000 (depicted in FIG. 20), and/or the like) performs operations associated with techniques for reporting processing latency of a repeater node.

As shown in FIG. 14, in some aspects, process 1400 may include receiving, from a repeater node, an indication of one or more latency values associated with one or more processing modes for repeating a signal (block 1410). For example, the control node (e.g., using reception component 2002, depicted in FIG. 20) may receive, from a repeater node, an indication of one or more latency values associated with one or more processing modes for repeating a signal, as described above.

As further shown in FIG. 14, in some aspects, process 1400 may include determining one or more parameters for transmitting the signal to the repeater node for repeating (block 1420). For example, the control node (e.g., using determination component 2008, depicted in FIG. 20) may determine one or more parameters for transmitting the signal to the repeater node for repeating, as described above.

Process 1400 may include additional aspects, such as any single aspect or any combination of aspects described below and/or in connection with one or more other processes described elsewhere herein.

In a first aspect, the one or more parameters for transmitting the signal to the repeater node for repeating include one or more of: a timing parameter, a signal type, or a number of symbols to use for the signal.

In a second aspect, alone or in combination with the first aspect, the one or more processing modes for repeating the signal include multiple digital processing modes.

In a third aspect, alone or in combination with one or more of the first and second aspects, process 1400 includes receiving, from the repeater node, an indication that the repeater node supports the one or more processing modes for repeating the signal.

In a fourth aspect, alone or in combination with one or more of the first through third aspects, the one or more latency values associated with the one or more processing modes for repeating the signal are based at least in part on one or more of a signal type of the signal, a modulation and coding scheme of the signal, or a number of symbols of the signal.

In a fifth aspect, alone or in combination with one or more of the first through fourth aspects, the one or more latency values comprise indications of one or more of a time expected to elapse between a start of reception of the signal and a start of transmission of a regeneration of the signal, a time expected to elapse between a completion of reception of the signal and a start of transmission of the regeneration of the signal, a time expected to elapse between reception of a command to repeat the signal and a start of reception of the signal, or a time expected to elapse between reception of the command to repeat the signal and a start of transmission of the regeneration of the signal.

In a fifth aspect, alone or in combination with one or more of the first through fourth aspects, the method further comprises transmitting, to one or more of a transmitter node or a receiver node, an indication of a configuration for communicating via the repeater node.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
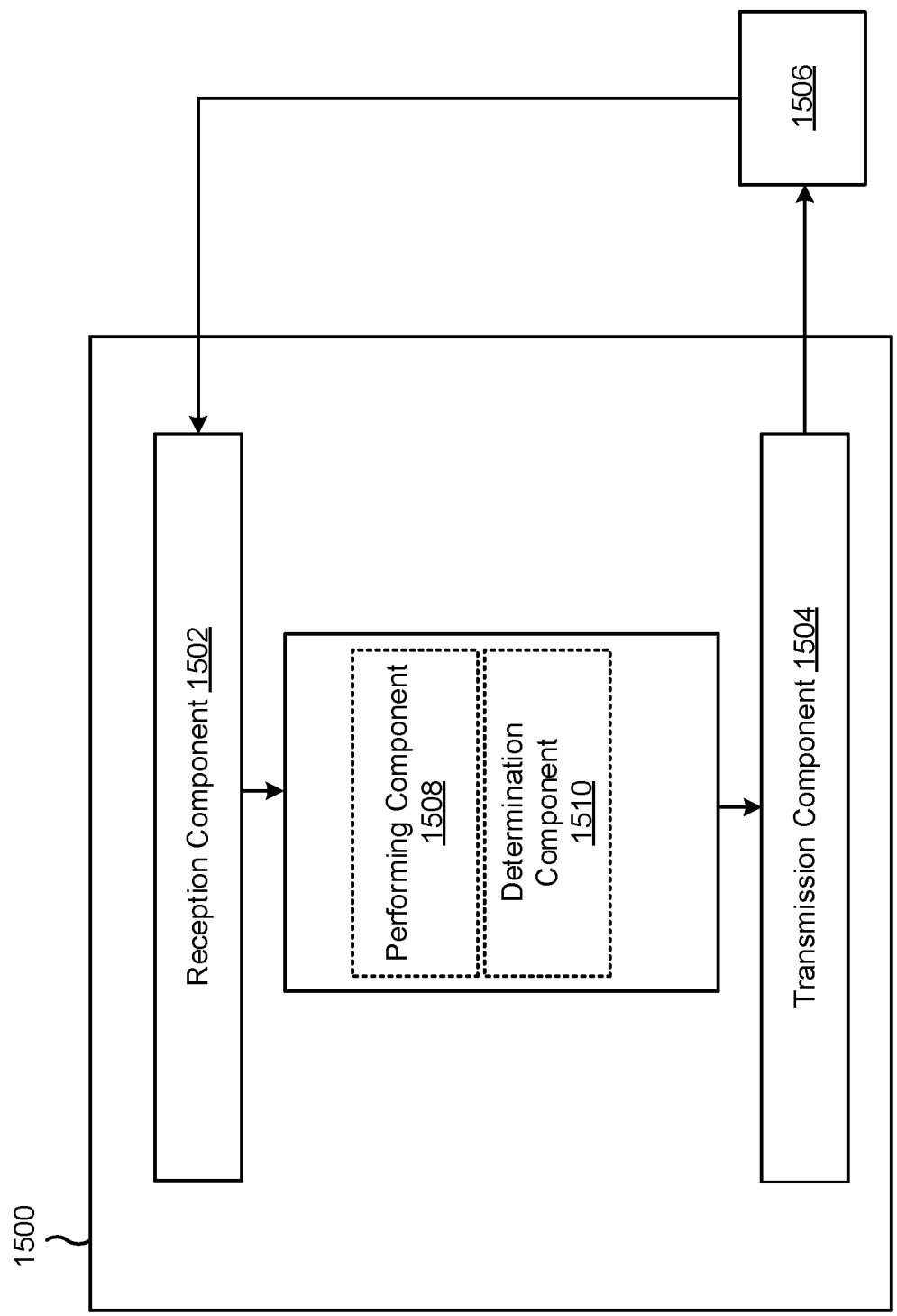
FIGS. 15-20 are block diagrams of example apparatuses for wireless communication, in accordance with the present disclosure.

FIG. 15 is a block diagram of an example apparatus 1500 for wireless communication. The apparatus 1500 may be a wireless node, or a wireless node may include the apparatus 1500. The apparatus 1500 may be a repeater node, or a repeater node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a performing component 1508, a determination component 1510, among other examples.

In some aspects, the apparatus 1500 may be configured to perform one or more operations described herein in connection with FIGS. 6-8. Additionally, or alternatively, the apparatus 1500 may be configured to perform one or more processes described herein, such as process 900 of FIG. 9, or a combination thereof. In some aspects, the apparatus 1500 and/or one or more components shown in FIG. 15 may include one or more components of the wireless node described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the devices described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the devices described above in connection with FIG. 2. In some aspects, the transmission component 1504 may be collocated with the reception component 1502 in a transceiver.

The transmission component 1504 may transmit, to a control node, an indication of a duplexing communication capability of the wireless node. The reception component 1502 may receive, from the control node, a configuration, for a repeating operation, that is based at least in part on the duplexing communication capability of the wireless node. The performing component 1508 may perform the repeating operation based at least in part on the configuration for the repeating operation. In some aspects, the performing component 1508 may include one or more antennas, a demodulator, a MIMO detector, a receive processor, a modulator, a transmit MIMO processor, a transmit processor, a controller/processor, a memory, or a combination thereof, of the devices described above in connection with FIG. 2.

The transmission component 1504 may transmit a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The reception component 1502 may receive, from the control node, a configuration, for a digital repeating operation, that is based at least in part on the capability report.

The determination component 1510 may determine the duplexing communication capability of the wireless node based at least in part on at least one of a stored configuration, an antenna array configuration associated with the wireless node, or a digital processing configuration. In some aspects, the determination component 1510 may include one or more of a receive processor, a transmit MIMO processor, a transmit processor, a controller/processor, a memory, or a combination thereof, of the devices described above in connection with FIG. 2.

The determination component 1510 may determine an active antenna array configuration associated with the wireless node. The determination component 1510 may determine the duplexing communication capability of the wireless node based at least in part on the active antenna array configuration. The determination component 1510 may determine that the wireless node is capable of receiving a signal during a first time period and forwarding the signal, in accordance with a digital repeating operation, during a second time period that overlaps with the first time.

The determination component 1510 may determine that the duplexing communication capability includes a full-duplex forwarding communication capability based at least in part on the determination that the wireless node is capable of receiving the signal during the first time period and forwarding the signal, in accordance with the digital repeating operation, during the second time period that overlaps with the first time period.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
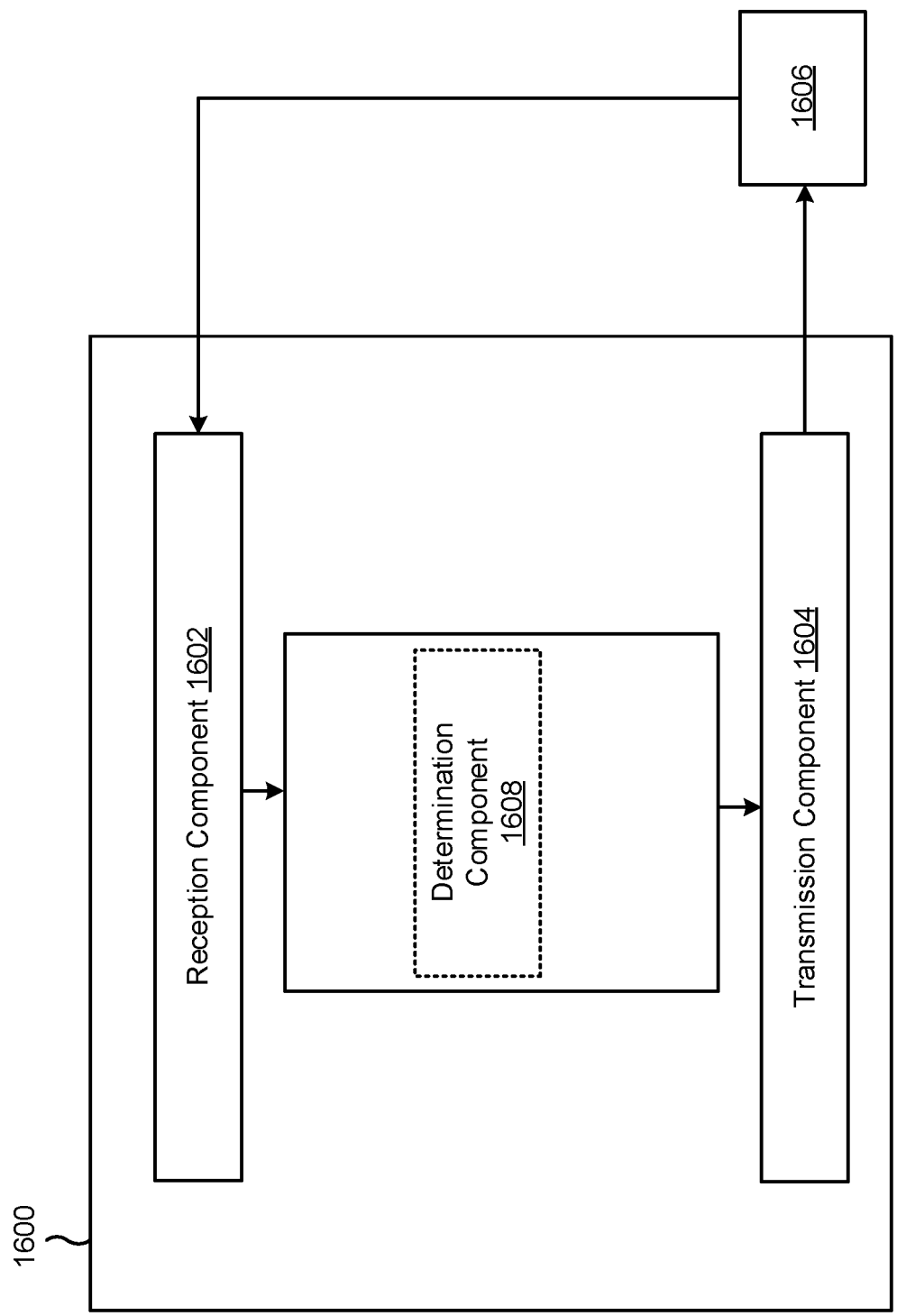

FIG. 16 is a block diagram of an example apparatus 1600 for wireless communication. The apparatus 1600 may be a control node, or a control node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include one or more of a determination component 1608, among other examples.

In some aspects, the apparatus 1600 may be configured to perform one or more operations described herein in connection with FIGS. 6-8. Additionally, or alternatively, the apparatus 1600 may be configured to perform one or more processes described herein, such as process 1000 of FIG. 10, or a combination thereof. In some aspects, the apparatus 1600 and/or one or more components shown in FIG. 16 may include one or more components of the control node described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the devices described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the devices described above in connection with FIG. 2. In some aspects, the transmission component 1604 may be collocated with the reception component 1602 in a transceiver.

The reception component 1602 may receive, from a repeater node, an indication of a duplexing communication capability of the repeater node. The transmission component 1604 may transmit, to the repeater node, a configuration for a repeating operation that is based at least in part on the duplexing communication capability of the repeater node. The determination component 1608 may determine the configuration for a repeating operation based at least in part on the duplexing communication capability of the repeater node. In some aspects, the determination component 1608 may include one or more of a receive processor, a transmit MIMO processor, a transmit processor, a controller/processor, a memory, or a combination thereof, of the devices described above in connection with FIG. 2.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
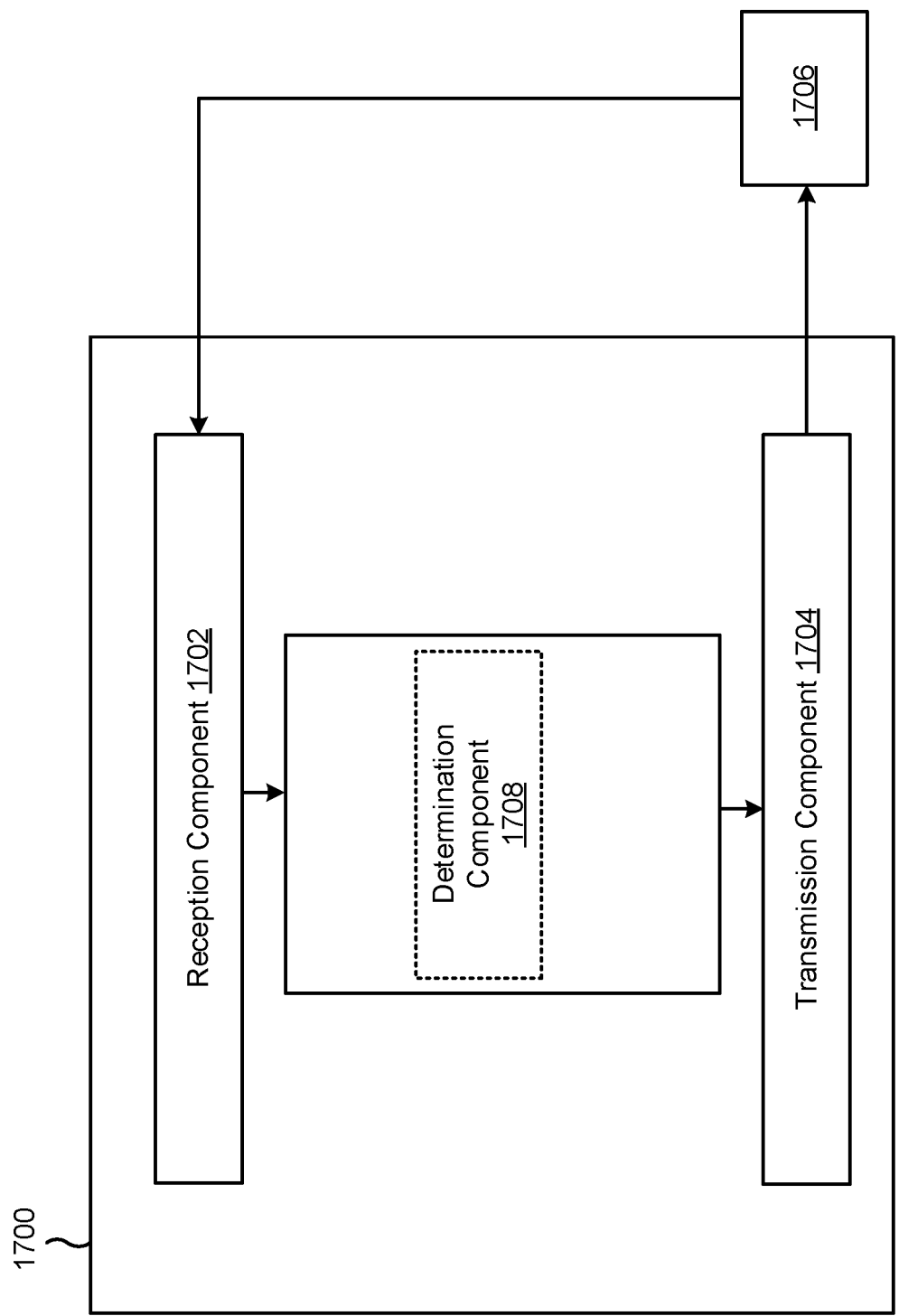

FIG. 17 is a block diagram of an example apparatus 1700 for wireless communication. The apparatus 1700 may be a repeater node, or a repeater node may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a determination component 1708.

In some aspects, the apparatus 1700 may be configured to perform one or more operations described herein in connection with FIGS. 6-8. Additionally, or alternatively, the apparatus 1700 may be configured to perform one or more processes described herein, such as process 1100 of FIG. 11. In some aspects, the apparatus 1700 and/or one or more components shown in FIG. 17 may include one or more components of the repeater node described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a demodulator, a MIMO detector, a receive processor, a controller/processor, a memory, or a combination thereof, of the repeater node described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the repeater node described above in connection with FIG. 2. In some aspects, the transmission component 1704 may be collocated with the reception component 1702 in a transceiver.

The transmission component 1704 may transmit a duplexing mode report that includes an indication of one or more duplexing modes supported by the repeater node, wherein the duplexing mode report includes one or more of an indication of a self-interference delay, an indication of a buffering capability, an indication of a forwarding latency, or an indication of a power consumption of the repeater node when operating in the one or more duplexing modes. The reception component 1702 may receive, from a control node, an indication of a duplexing mode to use for forwarding a signal.

The transmission component 1704 may transmit a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The reception component may receive, from the control node, a configuration, for a digital repeating operation, that is based at least in part on the capability report.

The determination component 1708 may determine one or more parameters of a duplexing mode report. In some aspects, the determination component 1708 may include one or more antennas, a modulator, a transmit MIMO processor, a transmit processor, a controller/processor, a memory, or a combination thereof, of the repeater node described above in connection with FIG. 2

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
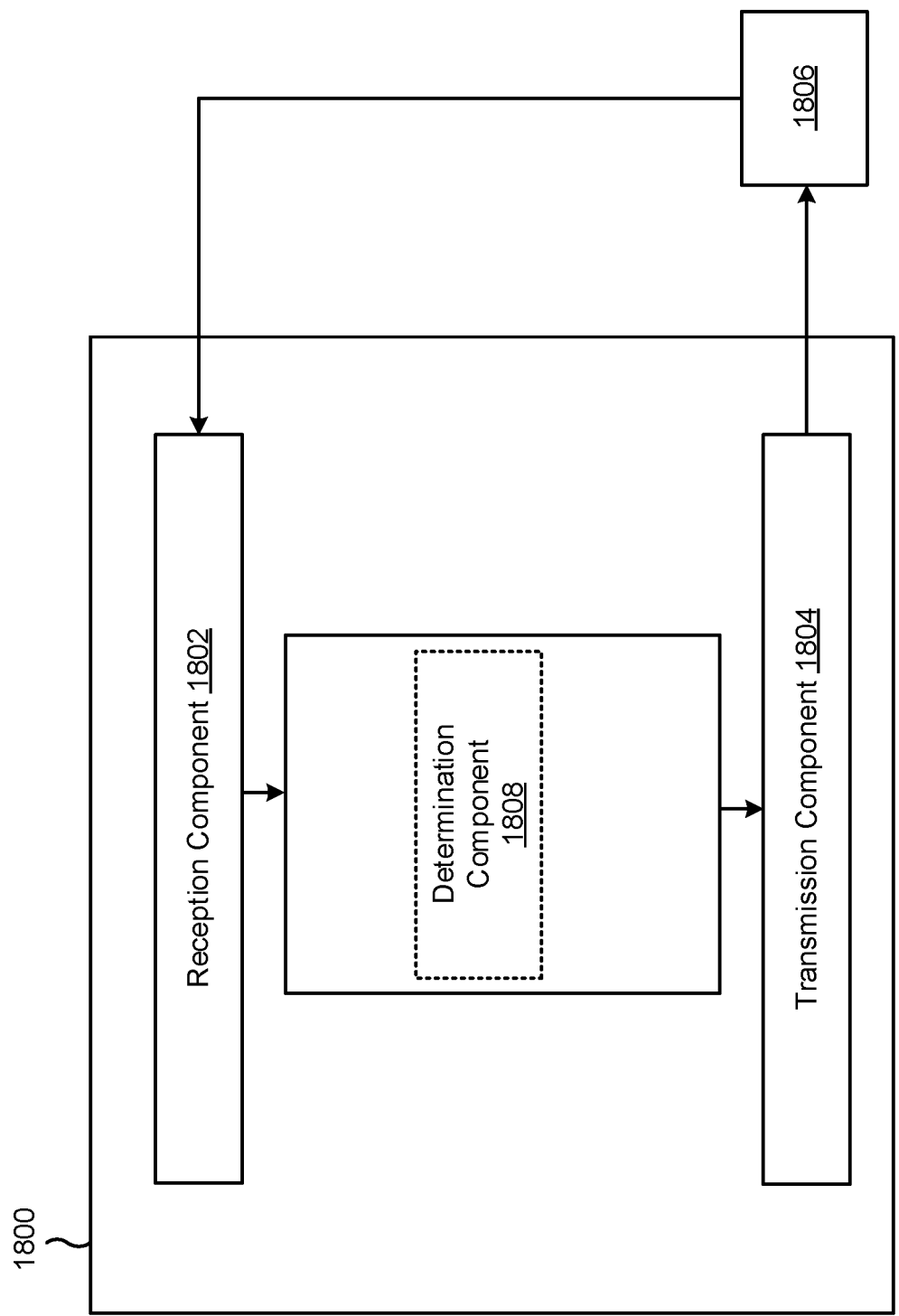

FIG. 18 is a block diagram of an example apparatus 1800 for wireless communication. The apparatus 1800 may be a control node, or a control node may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a determination component 1808.

In some aspects, the apparatus 1800 may be configured to perform one or more operations described herein in connection with FIGS. 6-8. Additionally, or alternatively, the apparatus 1800 may be configured to perform one or more processes described herein, such as process 1200 of FIG. 12. In some aspects, the apparatus 1800 and/or one or more components shown in FIG. 18 may include one or more components of the control node described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a demodulator, a MIMO detector, a receive processor, a controller/processor, a memory, or a combination thereof, of the control node described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the control node described above in connection with FIG. 2. In some aspects, the transmission component 1804 may be collocated with the reception component 1802 in a transceiver.

The reception component 1802 may receive, from a repeater node, a duplexing mode report that includes an indication of one or more duplexing modes supported by the repeater node, wherein the duplexing mode report includes one or more of an indication of a self-interference delay, an indication of a buffering capability, an indication of a forwarding latency, or an indication of a power consumption of the repeater node when operating in the one or more duplexing modes. The transmission component 1804 may transmit, to the repeater node, an indication of a duplexing mode for the repeater node to use for forwarding a signal.

The reception component 1802 may receive, from the repeater node, a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node. The transmission component 1804 may transmit, to the repeater node, a configuration, for a digital repeating operation, that is based at least in part on the capability report. The determination component 1808 may determine a configuration based at least in part on the capability report.

The determination component 1808 may determine the duplexing mode for the repeater node to use for forwarding the signal based at least in part on one or more of the indication of the self-interference delay, the indication of the buffering capability, the indication of the forwarding latency, the indication of the power consumption, or a quality of service requirement of the signal. In some aspects, the determination component 1808 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
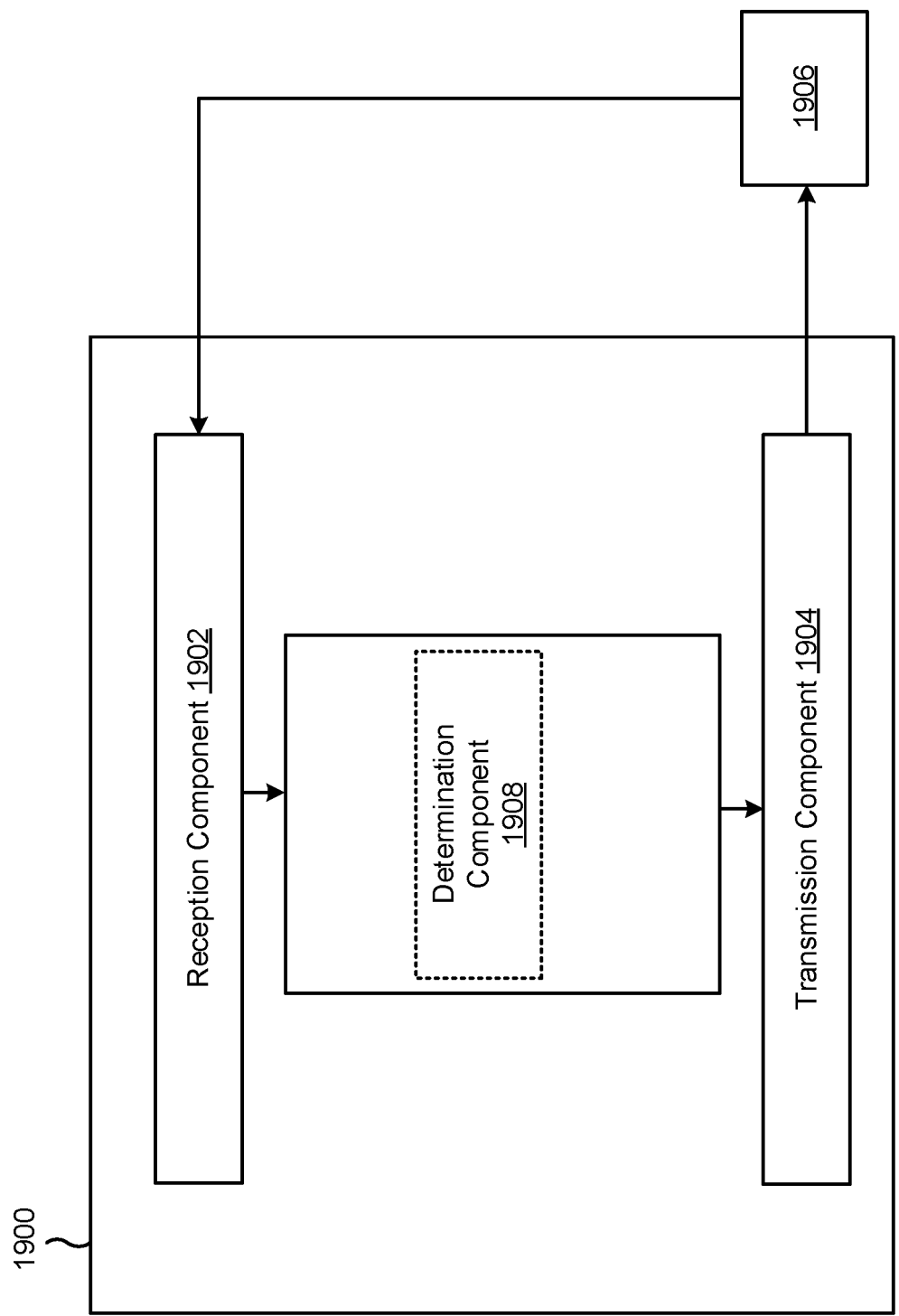

FIG. 19 is a block diagram of an example apparatus 1900 for wireless communication. The apparatus 1900 may be a repeater node, or a repeater node may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include a determination component 1908, among other examples.

In some aspects, the apparatus 1900 may be configured to perform one or more operations described herein in connection with FIGS. 6-8. Additionally, or alternatively, the apparatus 1900 may be configured to perform one or more processes described herein, such as process 1300 of FIG. 13. In some aspects, the apparatus 1900 and/or one or more components shown in FIG. 19 may include one or more components of the repeater node described above in connection with FIG. 2. Additionally, or alternatively, one or more components shown in FIG. 19 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1906. In some aspects, the reception component 1902 may include one or more antennas, a demodulator, a MIMO detector, a receive processor, a controller/processor, a memory, or a combination thereof, of the repeater node described above in connection with FIG. 2.

The transmission component 1904 may transmit communications, such as reference signals, control information, data communications, or a combination thereof, to the apparatus 1906. In some aspects, one or more other components of the apparatus 1906 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the repeater node described above in connection with FIG. 2. In some aspects, the transmission component 1904 may be collocated with the reception component 1902 in a transceiver.

The determination component 1908 may determine one or more latency values associated with one or more processing modes for repeating a signal. In some aspects, the determination component 1908 may include one or more antennas, a demodulator, a MIMO detector, a receive processor, a modulator, a transmit MIMO processor, a transmit processor, a controller/processor, a memory, or a combination thereof, of the repeater node described above in connection with FIG. 2. The transmission component 1904 may transmit, to a control node, an indication of the one or more latency values associated with the one or more processing modes for repeating the signal.

The transmission component 1904 may transmit, to the control node, an indication that the repeater supports the one or more processing modes for repeating the signal.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

Figure 20:
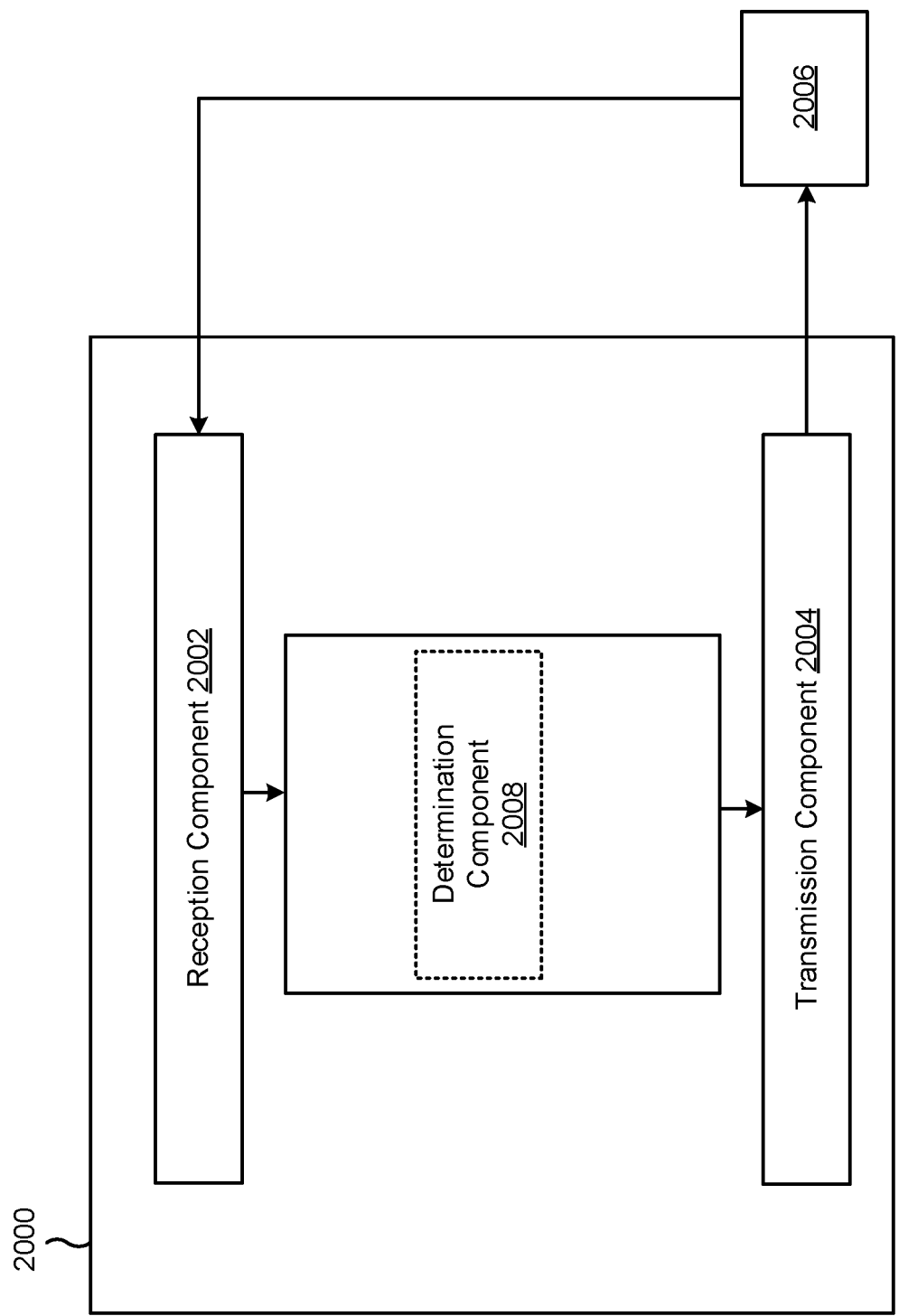

FIG. 20 is a block diagram of an example apparatus 2000 for wireless communication. The apparatus 2000 may be a control node, or a control node may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, or another wireless communication device) using the reception component 2002 and the transmission component 2004. As further shown, the apparatus 2000 may include a determination component 2008, among other examples.

In some aspects, the apparatus 2000 may be configured to perform one or more operations described herein in connection with FIGS. 6-8. Additionally, or alternatively, the apparatus 2000 may be configured to perform one or more processes described herein, such as process 1400 of FIG. 14. In some aspects, the apparatus 2000 and/or one or more components shown in FIG. 20 may include one or more components of the control node described above in connection with FIG. 2. Additionally, or alternatively, one or more components shown in FIG. 20 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2006. In some aspects, the reception component 2002 may include one or more antennas, a demodulator, a MIMO detector, a receive processor, a controller/processor, a memory, or a combination thereof, of the control node described above in connection with FIG. 2.

The transmission component 2004 may transmit communications, such as reference signals, control information, data communications, or a combination thereof, to the apparatus 2006. In some aspects, one or more other components of the apparatus 2006 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modulator, a transmit MIMO processor, a transmit processor, a controller/processor, a memory, or a combination thereof, of the control node described above in connection with FIG. 2. In some aspects, the transmission component 2004 may be collocated with the reception component 2002 in a transceiver.

The reception component 2002 may receive, from a repeater node, an indication of one or more latency values associated with one or more processing modes for repeating a signal. The determination component 2008 may determine one or more parameters for transmitting the signal to the repeater node for repeating. In some aspects, the determination component 2008 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The reception component 2002 may receive, from the repeater node, an indication that the repeater node supports the one or more processing modes for repeating the signal.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

The following provides an overview of some Aspects of the present disclosure:

Aspect 1: A method of wireless communication performed by a wireless node, comprising: transmitting, to a control node, an indication of a duplexing communication capability of the wireless node; receiving, from the control node, a configuration, for a repeating operation, that is based at least in part on the duplexing communication capability of the wireless node; and performing the repeating operation based at least in part on the configuration for the repeating operation.

Aspect 2: The method of Aspect 1, further comprising: determining the duplexing communication capability of the wireless node based at least in part on at least one of: a stored configuration, an antenna array configuration associated with the wireless node, or a digital processing configuration.

Aspect 3: The method of any of Aspects 1-2, wherein the duplexing communication capability of the wireless node is at least one of: a half-duplex communication capability, a full-duplex communication capability, a conditional full-duplex communication capability, or a full-duplex forwarding communication capability.

Aspect 4: The method of any of Aspects 1-3, further comprising: determining an active antenna array configuration associated with the wireless node; and determining the duplexing communication capability of the wireless node based at least in part on the active antenna array configuration.

Aspect 5: The method of Aspect 4, wherein determining the duplexing communication capability of the wireless node based at least in part on the active antenna array configuration comprises: determining that the wireless node supports a half-duplex communication capability when using a same antenna array for receiving communications and transmitting communications.

Aspect 6: The method of any of Aspects 4-5, wherein determining the duplexing communication capability of the wireless node based at least in part on the active antenna array configuration comprises: determining that the wireless node supports a full-duplex communication capability for one or more pairs of antenna arrays.

Aspect 7: The method of any of Aspects 1-6, wherein transmitting the indication of a duplexing communication capability of the wireless node comprises: transmitting, to the control node, an indication that the wireless node supports a conditional full-duplex communication capability associated with at least one of: one or more antenna array pairs, or one or more beam pairs.

Aspect 8: The method of any of Aspects 1-7, further comprising: determining that the wireless node is capable of receiving a signal during a first time period and forwarding the signal, in accordance with a digital repeating operation, during a second time period that overlaps with the first time period; and determining that the duplexing communication capability includes a full-duplex forwarding communication capability based at least in part on the determination that the wireless node is capable of receiving the signal during the first time period and forwarding the signal, in accordance with the digital repeating operation, during the second time period that overlaps with the first time period.

Aspect 9: The method of Aspect 8, wherein the digital repeating operation comprises: receiving, from a first wireless node, the signal; digitally processing the signal; regenerating the signal to form a regenerated signal based at least in part on digitally processing the signal; and transmitting, to a second wireless node, the regenerated signal.

Aspect 10: The method of any of Aspects 1-9, wherein transmitting the indication of the duplexing communication capability of the wireless node comprises: transmitting, during an initial capability exchange with the control node, the indication of the duplexing communication capability of the wireless node.

Aspect 11: The method of any of Aspects 1-10, wherein transmitting the indication of the duplexing communication capability of the wireless node comprises: receiving, from the control node, a request to provide the indication of the duplexing communication capability; and transmitting, to the control node, the indication of the duplexing communication capability of the wireless node based at least in part on the reception of the request to provide the indication of the duplexing communication capability.

Aspect 12: The method of any of Aspects 1-11, wherein transmitting the indication of the duplexing communication capability of the wireless node comprises: receiving, from the control node, a configuration for a repeating operation indicating a duplex operating mode for the wireless node; determining that the wireless node is not capable of supporting the duplex operating mode; and transmitting, to the control node, an indication that the wireless node is not capable of supporting the duplex operating mode.

Aspect 13: The method of any of Aspects 1-12, wherein the wireless node is at least one of: an analog repeater device, or a digital repeater device.

Aspect 14: A method of wireless communication performed by a control node, comprising: receiving, from a repeater node, an indication of a duplexing communication capability of the repeater node; and transmitting, to the repeater node, a configuration for a repeating operation that is based at least in part on the duplexing communication capability of the repeater node.

Aspect 15: The method of Aspect 14, wherein the duplexing communication capability of the repeater node is at least one of: a half-duplex communication capability, a full-duplex communication capability, a conditional full-duplex communication capability, or a full-duplex forwarding communication capability.

Aspect 16: The method of any of Aspects 14-15, wherein receiving the indication of the duplexing communication capability of the repeater node comprises: receiving, from the repeater node, an indication that the repeater node supports a conditional full-duplex communication capability associated with: one or more antenna array pairs of the repeater node, or one or more beam pairs at the repeater node.

Aspect 17: The method of any of Aspects 14-16, wherein receiving the indication of the duplexing communication capability of the repeater node comprises: receiving, during an initial capability exchange with the repeater node, the indication of the duplexing communication capability of the repeater node.

Aspect 18: The method of any of Aspects 14-17, wherein receiving the indication of the duplexing communication capability of the repeater node comprises: transmitting, to the repeater node, a request to provide the duplexing communication capability; and receiving, from the repeater node, the indication of the duplexing communication capability of the repeater node based at least in part on the transmission of the request to provide the duplexing communication capability.

Aspect 19: The method of any of Aspects 14-18, wherein receiving the indication of the duplexing communication capability of the repeater node comprises: transmitting, to the repeater node, a configuration for a repeating operation indicating a duplex operating mode for the repeater node; and receiving, from the repeater node, an indication that the repeater node is not capable of supporting the duplex operating mode.

Aspect 20: The method of any of Aspects 14-19, wherein the repeater node is at least one of: an analog repeater device, or a digital repeater device.

Aspect 21: A method of wireless communication performed by a repeater node, comprising: transmitting a duplexing mode report that includes an indication of one or more duplexing modes supported by the repeater node, wherein the duplexing mode report includes one or more of an indication of a self-interference delay, an indication of a buffering capability, an indication of a forwarding latency, or an indication of a power consumption of the repeater node when operating in the one or more duplexing modes; and receiving, from a control node, an indication of a duplexing mode to use for forwarding a signal.

Aspect 22: The method of Aspect 21, wherein the self-interference delay of the repeater node comprises: a sum of a clutter echo round trip time and a processing latency of an incoming signal.

Aspect 23: The method of Aspect 22, wherein the self-interference delay of the repeater node is based at least in part on a first beam configured for transmission by the repeater node and a second beam configured for reception by the repeater node.

Aspect 24: The method of any of Aspects 21-23, wherein the buffering capability of the repeater node is based at least in part on an amount of data that the repeater node can store.

Aspect 25: The method of any of Aspects 21-24, wherein the forwarding latency of the repeater node is based at least in part on: a time expected to elapse between a start of reception of the signal and a start of transmission of a regeneration of the signal, a time expected to elapse between a completion of reception of the signal and a start of transmission of the regeneration of the signal, a time expected to elapse between reception of a command to repeat the signal to a start of reception of the regeneration of the signal, or a time expected to elapse between reception of the command to repeat the signal and a start of transmission of the regeneration of the signal.

Aspect 26: The method of any of Aspects 21-25, wherein the power consumption of the repeater node is based at least in part on an amount of power consumed when operating in the one or more duplexing modes.

Aspect 27: The method of any of Aspects 21-26, wherein the one or more duplexing modes comprise one or more of: a full duplexing mode, a full duplex forwarding mode, or a half duplexing mode.

Aspect 28: A method of wireless communication performed by a control node, comprising: receiving, from a repeater node, a duplexing mode report that includes an indication of one or more duplexing modes supported by the repeater node, wherein the duplexing mode report includes one or more of an indication of a self-interference delay, an indication of a buffering capability, an indication of a forwarding latency, or an indication of a power consumption of the repeater node when operating in the one or more duplexing modes; and transmitting, to the repeater node, an indication of a duplexing mode for the repeater node to use for forwarding a signal.

Aspect 29: The method of Aspect 28, wherein the self-interference delay of the repeater node comprises: a sum of a clutter echo round trip time and a processing latency of an incoming signal for the repeater node.

Aspect 30: The method of Aspect 29, wherein the self-interference delay of the repeater node is based at least in part on a first beam configured for transmission by the repeater node and a second beam configured for reception by the repeater node.

Aspect 31: The method of any of Aspects 28-30, wherein the buffering capability of the repeater node is based at least in part on an amount of data that the repeater node can store after receiving the signal and forwarding the signal.

Aspect 32: The method of any of Aspects 28-31, wherein the forwarding latency of the repeater node is based at least in part on: a time expected to elapse between a start of reception of the signal and a start of transmission of a regeneration of the signal, a time expected to elapse between a completion of reception of the signal and a start of transmission of the regeneration of the signal, a time expected to elapse between reception of a command to repeat the signal to a start of reception of the regeneration of the signal, or a time expected to elapse between reception of the command to repeat the signal and a start of transmission of the regeneration of the signal.

Aspect 33: The method of any of Aspects 28-32, wherein the power consumption of the repeater node is based at least in part on an amount of power consumed when operating in the one or more duplexing modes.

Aspect 34: The method of any of Aspects 28-33, wherein the one or more duplexing modes comprise one or more of: a full duplexing mode, a full duplex forwarding mode, or a half duplexing mode.

Aspect 35: The method of any of Aspects 28-34, further comprising: determining the duplexing mode for the repeater node to use for forwarding the signal based at least in part on one or more of: the indication of the self-interference delay, the indication of the buffering capability, the indication of the forwarding latency, the indication of the power consumption, or a quality of service requirement of the signal.

Aspect 36: A method of wireless communication performed by a repeater node, comprising: determining one or more latency values associated with one or more processing modes for repeating a signal; and transmitting, to a control node, an indication of the one or more latency values associated with the one or more processing modes for repeating the signal.

Aspect 37: The method of Aspect 36, wherein the one or more processing modes for repeating the signal comprise multiple digital processing modes.

Aspect 38: The method of any of Aspects 36-37, further comprising: transmitting, to the control node, an indication that the repeater node supports the one or more processing modes for repeating the signal.

Aspect 39: The method of any of Aspects 36-38, wherein the determination of the one or more latency values associated with the one or more processing modes for repeating the signal comprises: determining the one or more latency values associated with the one or more processing modes for repeating the signal based at least in part on one or more of: a signal type of the signal, a modulation and coding scheme of the signal, a number of symbols of the signal, or an occupied bandwidth of the signal.

Aspect 40: The method of any of Aspects 36-39, wherein the one or more latency values comprise indications of one or more of: a time expected to elapse between a start of reception of the signal and a start of transmission of a regeneration of the signal, a time expected to elapse between a completion of reception of the signal and a start of transmission of the regeneration of the signal, a time expected to elapse between reception of a command to repeat the signal to a start of reception of the signal, or a time expected to elapse between reception of the command to repeat the signal and a start of transmission of the regeneration of the signal.

Aspect 41: The method of any of Aspects 36-40, further comprising: receiving a configuration for forwarding a signal to a receiving device or the control node, wherein the configuration is based at least in part on the one or more latency values.

Aspect 42: The method of Aspect 41, wherein forwarding the signal comprises one or more of: transmitting the signal via beamforming, or transmitting the signal in a millimeter wave band.

Aspect 43: A method of wireless communication performed by a control node, comprising: receiving, from a repeater node, an indication of one or more latency values associated with one or more processing modes for repeating a signal; and determining one or more parameters for transmitting the signal to the repeater node for repeating.

Aspect 44: The method of Aspect 43, wherein the one or more parameters for transmitting the signal to the repeater node for repeating comprise one or more of: a timing parameter, a signal type, or a number of symbols to use for the signal.

Aspect 45: The method of any of Aspects 43-44, wherein the one or more processing modes for repeating the signal comprise multiple digital processing modes.

Aspect 46: The method of any of Aspects 43-45, further comprising: receiving, from the repeater node, an indication that the repeater node supports the one or more processing modes for repeating the signal.

Aspect 47: The method of any of Aspects 43-46, wherein the one or more latency values associated with the one or more processing modes for repeating the signal are based at least in part on one or more of: a signal type of the signal, a modulation and coding scheme of the signal, a number of symbols of the signal, or an occupied bandwidth of the signal.

Aspect 48: The method of any of Aspects 43-47, wherein the one or more latency values comprise indications of one or more of: a time expected to elapse between a start of reception of the signal and a start of transmission of a regeneration of the signal, a time expected to elapse between a completion of reception of the signal and a start of transmission of the regeneration of the signal, a time expected to elapse between reception of a command to repeat the signal and a start of reception of the signal, or a time expected to elapse between reception of the command to repeat the signal and a start of transmission of the regeneration of the signal.

Aspect 49: The method of any of Aspects 43-48, further comprising: transmitting, to one or more of a transmitter node or a receiver node, an indication of a configuration for communicating via the repeater node.

Aspect 50: A method of wireless communication performed by a repeater node, comprising: transmitting a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node; and receiving, from a control node, a configuration, for a digital repeating operation, that is based at least in part on the capability report.

Aspect 51: The method of Aspect 50, further comprising: performing the digital repeating operation based at least in part on the configuration for the repeating operation.

Aspect 52: The method of Aspect 51, wherein performing the digital repeating operation comprises: receiving, from a first wireless node, a signal; digitally processing the signal; regenerating the signal to form a regenerated signal based at least in part on digitally processing the signal; and transmitting, to a second wireless node, the regenerated signal.

Aspect 53: The method of any of Aspects 50-52, wherein the duplexing mode report includes an indication of the one or more duplexing modes supported by the repeater node, and wherein the duplexing mode report includes one or more of an indication of a self-interference delay, an indication of a buffering capability, an indication of a forwarding latency, or an indication of a power consumption of the repeater node when operating in the one or more duplexing modes.

Aspect 54: The method of Aspect 53, wherein the self-interference delay of the repeater node comprises a sum of a clutter echo round trip time and a processing latency of an incoming signal.

Aspect 55: The method of any of Aspects 53-54, wherein the buffering capability of the repeater node is based at least in part on an amount of data that the repeater node can store.

Aspect 56: The method of any of Aspects 53-55, wherein the power consumption of the repeater node is based at least in part on an amount of power consumed when operating in the one or more duplexing modes.

Aspect 57: The method of any of Aspects 50-56, wherein transmitting the capability report comprises: receiving, from the control node, an initial configuration for the digital repeating operation; and transmitting, to the control node, the capability report based at least in part on the repeater node being unable to support the initial configuration.

Aspect 58: The method of any of Aspects 50-57, wherein transmitting the capability report comprises: transmitting, during an initial capability exchange with the control node, the capability report.

Aspect 59: The method of any of Aspects 50-58, wherein transmitting the capability report comprises: transmitting, to the control node, an indication that the repeater node supports a conditional full-duplex communication capability associated with at least one of: one or more antenna array pairs, or one or more beam pairs.

Aspect 60: The method of any of Aspects 50-59, wherein the duplexing communication capability of the repeater node is at least one of: a half-duplex communication capability, a full-duplex communication capability, a conditional full-duplex communication capability, or a full-duplex forwarding communication capability.

Aspect 61: The method of any of Aspects 50-60, wherein the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

Aspect 62: The method of any of Aspects 50-61, wherein the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Aspect 63: A method of wireless communication performed by a control node, comprising: receiving, from a repeater node, a capability report that includes an indication of one or more capabilities of the repeater node, wherein the capability report includes one or more of a duplexing mode report, an indication of one or more latency values associated with one or more processing modes of the repeater node, or an indication of a duplexing communication capability of the repeater node; and transmitting, to the repeater node, a configuration, for a digital repeating operation, that is based at least in part on the capability report.

Aspect 64: The method of Aspect 63, further comprising: determining the configuration based at least in part on the capability report.

Aspect 65: The method of any of Aspects 63-64, wherein the duplexing mode report includes an indication of the one or more duplexing modes supported by the repeater node, and wherein the duplexing mode report includes one or more of an indication of a self-interference delay, an indication of a buffering capability, an indication of a forwarding latency, or an indication of a power consumption of the repeater node when operating in the one or more duplexing modes.

Aspect 66: The method of Aspect 65, wherein the self-interference delay of the repeater node comprises a sum of a clutter echo round trip time and a processing latency of an incoming signal.

Aspect 67: The method of any of Aspects 65-66, wherein the buffering capability of the repeater node is based at least in part on an amount of data that the repeater node can store.

Aspect 68: The method of any of Aspects 65-67, wherein the power consumption of the repeater node is based at least in part on an amount of power consumed when operating in the one or more duplexing modes.

Aspect 69: The method of any of Aspects 63-68, wherein receiving the capability report comprises: transmitting, to the repeater node, an initial configuration for the digital repeating operation; and receiving, from the repeater node, the capability report based at least in part on the repeater node being unable to support the initial configuration.

Aspect 70: The method of any of Aspects 63-69, wherein receiving the capability report comprises: receiving, during an initial capability exchange with the repeater node, the capability report.

Aspect 71: The method of any of Aspects 63-70, wherein receiving the capability report comprises: receiving, from the repeater node, an indication that the repeater node supports a conditional full-duplex communication capability associated with at least one of: one or more antenna array pairs, or one or more beam pairs.

Aspect 72: The method of any of Aspects 63-71, wherein the duplexing communication capability of the repeater node is at least one of: a half-duplex communication capability, a full-duplex communication capability, a conditional full-duplex communication capability, or a full-duplex forwarding communication capability.

Aspect 73: The method of any of Aspects 63-72, wherein the one or more latency values associated with the one or more processing modes, for repeating a signal, are based at least in part on one or more of: a signal type of the signal, a modulation and coding scheme of the signal, a number of symbols of the signal, or an occupied bandwidth of the signal.

Aspect 74: The method of any of Aspects 63-73, wherein the one or more latency values comprise indications of one or more of: a time expected to elapse between a start of reception of a signal and a start of transmission of a regeneration of the signal, a time expected to elapse between a completion of reception of the signal and the start of transmission of the regeneration of the signal, a time expected to elapse between reception of a command to repeat the signal to the start of reception of the signal, or a time expected to elapse between the reception of the command to repeat the signal and the start of transmission of the regeneration of the signal.

Aspect 75: An apparatus for wireless communication at a device, comprising a processor; memory coupled with the processor; and instructions stored in the memory and executable by the processor to cause the apparatus to perform the method of one or more of Aspects 1-13, 21-27, 36-42, and 50-62.

Aspect 76: A device for wireless communication, comprising a memory and one or more processors coupled to the memory, the one or more processors configured to perform the method of one or more of Aspects 1-13, 21-27, 36-42, and 50-62.

Aspect 77: An apparatus for wireless communication, comprising at least one means for performing the method of one or more of Aspects 1-13, 21-27, 36-42, and 50-62.

Aspect 78: A non-transitory computer-readable medium storing code for wireless communication, the code comprising instructions executable by a processor to perform the method of one or more of Aspects 1-13, 21-27, 36-42, and 50-62.

Aspect 79: A non-transitory computer-readable medium storing a set of instructions for wireless communication, the set of instructions comprising one or more instructions that, when executed by one or more processors of a device, cause the device to perform the method of one or more of Aspects 1-13, 21-27, 36-42, and 50-62.

Aspect 80: An apparatus for wireless communication at a device, comprising a processor; memory coupled with the processor; and instructions stored in the memory and executable by the processor to cause the apparatus to perform the method of one or more of Aspects 14-20, 28-35, 43-49, and 63-74.

Aspect 81: A device for wireless communication, comprising a memory and one or more processors coupled to the memory, the one or more processors configured to perform the method of one or more of Aspects 14-20, 28-35, 43-49, and 63-74.

Aspect 82: An apparatus for wireless communication, comprising at least one means for performing the method of one or more of Aspects 14-20, 28-35, 43-49, and 63-74.

Aspect 83: A non-transitory computer-readable medium storing code for wireless communication, the code comprising instructions executable by a processor to perform the method of one or more of Aspects 14-20, 28-35, 43-49, and 63-74.

Aspect 84: A non-transitory computer-readable medium storing a set of instructions for wireless communication, the set of instructions comprising one or more instructions that, when executed by one or more processors of a device, cause the device to perform the method of one or more of Aspects 14-20, 28-35, 43-49, and 63-74.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a repeater node, comprising:
    transmitting a capability report that includes an indication of one or more capabilities of the repeater node, wherein the one or more capabilities include a self-interference delay at the repeater node that is based at least in part on a clutter echo round trip time, and wherein the capability report includes one or more of a duplexing mode report, an indication of one or more latency values associated with one or more processing modes of the repeater node, or an indication of a duplexing communication capability of the repeater node; and
    receiving, from a control node, a configuration, for a digital repeating operation, that is based at least in part on the capability report.

2. The method of claim 1, further comprising:
    performing the digital repeating operation based at least in part on the configuration for the digital repeating operation.

3. The method of claim 2, wherein performing the digital repeating operation comprises:
    receiving, from a first wireless node, a signal;
    digitally processing the signal;
    regenerating the signal to form a regenerated signal based at least in part on digitally processing the signal; and
    transmitting, to a second wireless node, the regenerated signal.

4. The method of claim 1, wherein the duplexing mode report includes an indication of one or more duplexing modes supported by the repeater node, and wherein the duplexing mode report includes one or more of an indication of a buffering capability, an indication of a forwarding latency, or an indication of a power consumption of the repeater node when operating in the one or more duplexing modes.

5. The method of claim 4, wherein the self-interference delay of the repeater node comprises a sum of the clutter echo round trip time and a processing latency of an incoming signal.

6. The method of claim 4, wherein the buffering capability of the repeater node is based at least in part on an amount of data that the repeater node can store.

7. The method of claim 4, wherein the power consumption of the repeater node is based at least in part on an amount of power consumed when operating in the one or more duplexing modes.

8. The method of claim 1, wherein transmitting the capability report comprises:
    receiving, from the control node, an initial configuration for the digital repeating operation; and
    transmitting, to the control node, the capability report based at least in part on the repeater node being unable to support the initial configuration.

9. The method of claim 1, wherein transmitting the capability report comprises:
    transmitting, during an initial capability exchange with the control node, the capability report.

10. The method of claim 1, wherein transmitting the capability report comprises:
    transmitting, to the control node, an indication that the repeater node supports a conditional full-duplex communication capability associated with at least one of: one or more antenna array pairs, or one or more beam pairs.

11. The method of claim 1, wherein the duplexing communication capability of the repeater node is at least one of:
    a half-duplex communication capability,
    a full-duplex communication capability,
    a conditional full-duplex communication capability, or
    a full-duplex forwarding communication capability.

12. The method of claim 1, wherein the one or more latency values associated with the one or more processing modes, for repeating a signal, are based at least in part on one or more of:
    a signal type of the signal,
    a modulation and coding scheme of the signal,
    a number of symbols of the signal, or
    an occupied bandwidth of the signal.

13. The method of claim 1, wherein the one or more latency values comprise indications of one or more of:
    a time expected to elapse between a start of reception of a signal and a start of transmission of a regeneration of the signal,
    a time expected to elapse between a completion of reception of the signal and the start of transmission of the regeneration of the signal,
    a time expected to elapse between reception of a command to repeat the signal to the start of reception of the signal, or
    a time expected to elapse between the reception of the command to repeat the signal and the start of transmission of the regeneration of the signal.

14. A repeater node for wireless communication, comprising:
    a memory; and
    one or more processors, coupled to the memory, configured to:
        transmit a capability report that includes an indication of one or more capabilities of the repeater node, wherein the one or more capabilities include a self-interference delay at the repeater node that is based at least in part on a clutter echo round trip time, and wherein the capability report includes one or more of a duplexing mode report, an indication of one or more latency values associated with one or more processing modes of the repeater node, or an indication of a duplexing communication capability of the repeater node; and
        receive, from a control node, a configuration, for a digital repeating operation, that is based at least in part on the capability report.

15. The repeater node of claim 14, wherein the one or more processors are further configured to:
    perform the digital repeating operation based at least in part on the configuration for the digital repeating operation.

16. The repeater node of claim 15, wherein the one or more processors, to perform the digital repeating operation, are configured to:
    receive, from a first wireless node, a signal;
    digitally process the signal;
    regenerate the signal to form a regenerated signal based at least in part on digitally processing the signal; and
    transmit, to a second wireless node, the regenerated signal.

17. The repeater node of claim 14, wherein the duplexing mode report includes an indication of one or more duplexing modes supported by the repeater node, and wherein the duplexing mode report includes one or more of an indication of a buffering capability, an indication of a forwarding latency, or an indication of a power consumption of the repeater node when operating in the one or more duplexing modes.

18. The repeater node of claim 17, wherein the self-interference delay of the repeater node comprises a sum of the clutter echo round trip time and a processing latency of an incoming signal.

19. The repeater node of claim 17, wherein the buffering capability of the repeater node is based at least in part on an amount of data that the repeater node can store.

20. The repeater node of claim 17, wherein the power consumption of the repeater node is based at least in part on an amount of power consumed when operating in the one or more duplexing modes.

21. The repeater node of claim 14, wherein the one or more processors, to transmit the capability report, are configured to:
receive, from the control node, an initial configuration for the digital repeating operation; and
transmit, to the control node, the capability report based at least in part on the repeater node being unable to support the initial configuration.

22. The repeater node of claim 14, wherein the one or more processors, to transmit the capability report, are configured to:
transmit, during an initial capability exchange with the control node, the capability report.

23. The repeater node of claim 14, wherein the one or more processors, to transmit the capability report, are configured to:
transmit, to the control node, an indication that the repeater node supports a conditional full-duplex communication capability associated with at least one of: one or more antenna array pairs, or one or more beam pairs.

24. The repeater node of claim 14, wherein the duplexing communication capability of the repeater node is at least one of:
a half-duplex communication capability,
a full-duplex communication capability,
a conditional full-duplex communication capability, or
a full-duplex forwarding communication capability.

25. The repeater node of claim 14, wherein the one or more latency values associated with the one or more processing modes, for repeating a signal, are based at least in part on one or more of:
a signal type of the signal,
a modulation and coding scheme of the signal,
a number of symbols of the signal, or
an occupied bandwidth of the signal.

26. The repeater node of claim 14, wherein the one or more latency values comprise indications of one or more of:
a time expected to elapse between a start of reception of a signal and a start of transmission of a regeneration of the signal,
a time expected to elapse between a completion of reception of the signal and the start of transmission of the regeneration of the signal,
a time expected to elapse between reception of a command to repeat the signal to the start of reception of the signal, or
a time expected to elapse between the reception of the command to repeat the signal and the start of transmission of the regeneration of the signal.

27. A non-transitory computer-readable medium storing a set of instructions for wireless communication, the set of instructions comprising:
one or more instructions that, when executed by one or more processors of a repeater node, cause the repeater node to:
transmit a capability report that includes an indication of one or more capabilities of the repeater node, wherein the one or more capabilities include a self-interference delay at the repeater node that is based at least in part on a clutter echo round trip time, and wherein the capability report includes one or more of a duplexing mode report, an indication of one or more latency values associated with one or more processing modes of the repeater node, or an indication of a duplexing communication capability of the repeater node; and
receive, from a control node, a configuration, for a digital repeating operation, that is based at least in part on the capability report.

28. The non-transitory computer-readable medium of claim 27, wherein the duplexing mode report includes an indication of one or more duplexing modes supported by the repeater node, and wherein the duplexing mode report includes one or more of an indication of a buffering capability, an indication of a forwarding latency, or an indication of a power consumption of the repeater node when operating in the one or more duplexing modes.

29. An apparatus for wireless communication, comprising:
means for transmitting a capability report that includes an indication of one or more capabilities of the apparatus, wherein the one or more capabilities include a self-interference delay at the repeater node that is based at least in part on a clutter echo round trip time, and wherein the capability report includes one or more of a duplexing mode report, an indication of one or more latency values associated with one or more processing modes of the apparatus, or an indication of a duplexing communication capability of the apparatus; and
means for receiving, from a control node, a configuration, for a digital repeating operation, that is based at least in part on the capability report.

30. The apparatus of claim 29, further comprising:
means for performing the digital repeating operation based at least in part on the configuration for the digital repeating operation.

* * * * *